(12) United States Patent
Tang

(10) Patent No.: US 11,627,611 B2
(45) Date of Patent: Apr. 11, 2023

(54) WIRELESS COMMUNICATION METHOD AND DEVICE FOR BLIND DETECTION OF DOWNLINK SIGNALS

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 207 days.

(21) Appl. No.: 17/109,965

(22) Filed: Dec. 2, 2020

(65) Prior Publication Data

US 2021/0092779 A1 Mar. 25, 2021

Related U.S. Application Data

(63) Continuation of application No. PCT/CN2019/097973, filed on Jul. 26, 2019.

(30) Foreign Application Priority Data

Jul. 27, 2018 (CN) .......................... 201810848129.6

(51) Int. Cl.
*H04W 74/08* (2009.01)
*H04W 76/27* (2018.01)
*H04L 5/00* (2006.01)
*H04L 27/26* (2006.01)
*H04W 80/02* (2009.01)

(52) U.S. Cl.
CPC ....... *H04W 74/0858* (2013.01); *H04L 5/0094* (2013.01); *H04L 27/2607* (2013.01); *H04W 76/27* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 2014/0112289 | A1 | 4/2014 | Kim et al. |
| 2016/0100404 | A1 | 4/2016 | Han et al. |
| 2016/0301556 | A1 | 10/2016 | Nory et al. |

(Continued)

FOREIGN PATENT DOCUMENTS

| | | |
|---|---|---|
| CN | 105577339 A | 5/2016 |
| CN | 106332297 A | 1/2017 |

(Continued)

OTHER PUBLICATIONS

International search report with English Translation for PCT/CN2019/097973, dated Oct. 24, 2019 (17 pages).

(Continued)

*Primary Examiner* — Diane L Lo
(74) *Attorney, Agent, or Firm* — Young Basile Hanlon & MacFarlane, P.C.

(57) ABSTRACT

A wireless communication method and device are disclosed. The method includes performing channel detection for a carrier in an unlicensed frequency band; and sending a preamble signal on the carrier from a first time-point, in response to the channel detection succeeding, the preamble signal being configured for indicating that the carrier has an ability to transmit a downlink signal.

24 Claims, 8 Drawing Sheets

(56) References Cited

U.S. PATENT DOCUMENTS

2019/0116010 A1* 4/2019 Li ................... H04L 27/2613
2019/0393734 A1* 12/2019 Zhou ................... H02J 50/12
2020/0015268 A1* 1/2020 Zhang ............... H04W 74/0808

FOREIGN PATENT DOCUMENTS

| CN | 106685614 A | 5/2017 |
| WO | 2016164141 A1 | 10/2016 |

OTHER PUBLICATIONS

Extended European Search Report for EP Application 19841578.8 dated Aug. 6, 2021. (10 pages).
Chinese First Office Action with English Translation for CN Application 201980049148.5 dated Nov. 18, 2022. (44 pages).

* cited by examiner

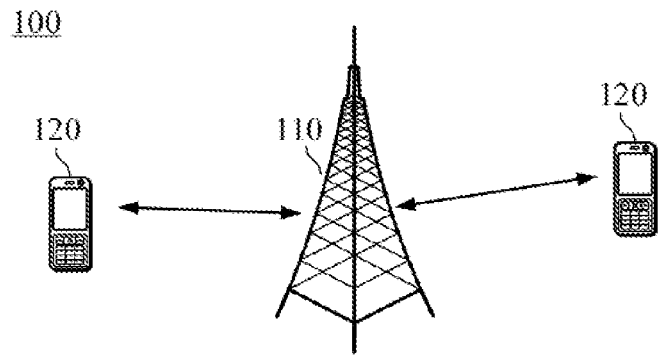
FIG. 1
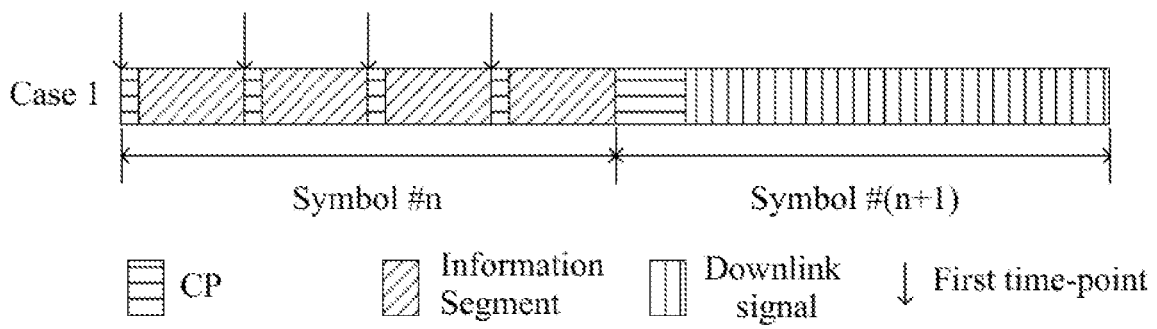
FIG. 2
FIG. 3

WIRELESS COMMUNICATION METHOD AND DEVICE FOR BLIND DETECTION OF DOWNLINK SIGNALS

CROSS-REFERENCE TO RELATED APPLICATIONS

This application is a continuation-application of International (PCT) Patent Application No. PCT/CN 2019/097973 filed on Jul. 26, 2019, which claims priority to Chinese Patent Application No. 201810848129.6, filed on Jul. 27, 2018, the entire contents of both of which are herein incorporated by reference.

TECHNICAL FIELD

The present disclosure generally relates to the technical field of communication, and in particular, to a wireless communication method and device.

BACKGROUND

The New Radio (NR) system can support data transmission on unlicensed frequency bands (unlicensed frequency bands). Specifically, when a network device communicates on an unlicensed frequency band, it needs to be based on Listen Before Talk (LBT). That is, the network device needs to perform channel detection (or channel listening) before sending a downlink signal on a channel with an unlicensed frequency. When the result of channel detection is that the channel is idle, the network device sends the downlink signal.

Due to the uncertainty when the network device sends the downlink signal, a terminal device needs to perform blind detection when receiving the downlink signal to determine whether the network device sends the downlink signal. This causes high complexity and power consumption of the terminal device.

SUMMARY

According to a first aspect, a wireless communication method is provided, which includes: performing channel detection for a carrier in an unlicensed frequency band; and sending a preamble signal on the carrier from a first time-point, in response to the channel detection succeeding, the preamble signal being configured for indicating that the carrier has an ability to transmit a downlink signal.

According to a second aspect, a wireless communication method is provided, which includes: detecting a preamble signal on a carrier in an unlicensed frequency band from a first time-point; and receiving a downlink signal on the carrier, in response to the preamble signal being successfully detected.

According to a third aspect, a network device is provided, which includes a processor and a memory. The memory stores a computer program, and the processor is used for calling and performing the computer program stored in the memory to execute the method in the above first aspect or implementations thereof.

According to a fourth aspect, a terminal device is provided, which includes a processor and a memory. The memory stores a computer program, and the processor is used for calling and performing the computer program stored in the memory to execute the method in the above second aspect or implementations thereof.

BRIEF DESCRIPTION OF THE DRAWINGS

FIG. 1 is a schematic diagram of a wireless communication system according to some embodiments of the present disclosure.

FIG. 2 is a schematic flowchart of a wireless communication method according to some embodiments of the present disclosure.

FIG. 3 is a schematic diagram of a method for determining a first time-point according to some embodiments of the present disclosure.

DETAILED DESCRIPTION

Figure 4:
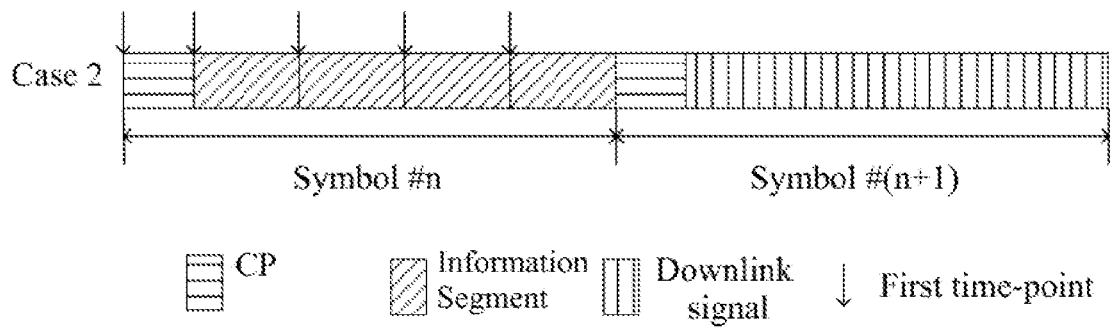
FIG. 4 is a schematic diagram of another method for determining a first time-point according to some embodiments of the present disclosure.

The technical solutions of embodiments of the present disclosure will be described below in conjunction with the accompanying drawings.

A wireless communication method is provided, which includes: performing channel detection for a carrier in an unlicensed frequency band; and sending a preamble signal on the carrier from a first time-point, in response to the channel detection succeeding, the preamble signal being configured for indicating that the carrier has an ability to transmit a downlink signal.

In some embodiments, the first time-point is determined according to at least one of a format of a preamble signal symbol configured for sending the preamble signal and a time-point at which the channel detection succeeds.

In some embodiments, the first time-point includes at least one of a candidate time-point in the preamble signal symbol and a starting point of the preamble signal symbol.

In some embodiments, the preamble signal symbol is the first preamble signal symbol which is located behind the time-point at which the channel detection succeeds.

In some embodiments, the preamble signal symbol includes a first cyclic prefix (CP) and an information segment; and the first time-point includes a starting point of the first CP in the preamble signal symbol.

In some embodiments, the preamble signal symbol includes a second CP and M information segments, wherein M is a positive integer greater than or equal to 2; and the first time-point includes a starting point of the second CP or any one of the M information segments in the preamble signal symbol.

In some embodiments, the method further includes sending an occupying signal or a CP of the preamble signal on the carrier from the time-point at which the channel detection succeeds to the first time-point, in response to the first time-point not being the time-point at which the channel detection succeeds.

In some embodiments, the first time-point includes a starting point of a downlink signal symbol configured for sending the downlink signal.

In some embodiments, the method further includes sending the downlink signal on the carrier from a second time-point, after the preamble signal is sent, wherein the second time-point is a starting point of the downlink signal symbol.

In some embodiments, the preamble signal symbol corresponds to a first subcarrier spacing; and the first subcarrier spacing is a subcarrier spacing greater than or equal to that corresponding to the downlink signal, or a length of the preamble signal symbol is less than or equal to a length of the downlink signal symbol. Alternatively, the first subcarrier spacing is a subcarrier spacing indicated by at least one of a radio resource control (RRC) signaling, a physical-layer signaling, and a MAC-layer signaling. Alternatively, the first subcarrier spacing is a predefined subcarrier spacing.

In some embodiments, a time-length for sending the preamble signal is greater than or equal to a length of P preamble signal symbols, and P is a positive integer; or the time-length for sending the preamble signal is greater than or equal to a length of information segments of Q preamble signal symbols, and Q is a positive integer greater than or equal to 2.

In some embodiments, a sequence of the preamble signal is mapped to M contiguous subcarriers on a first bandwidth in frequency domain, wherein a length of the sequence of the preamble signal is M, and M is a positive integer, and a subcarrier spacing of the preamble signal is greater than that of the downlink signal; or a sequence of the preamble signal is mapped to M discrete subcarriers on a first bandwidth in frequency domain, wherein any two adjacent subcarriers in the M discrete subcarriers has a same distance, a length of the sequence of the preamble signal is M, and M is a positive integer, and a subcarrier spacing of the preamble signal is equal to that of the downlink signal. The M subcarriers occupy the full first bandwidth, a central part of the first bandwidth, or a predefined part of the first bandwidth.

In some embodiments, no signal is mapped to other subcarriers on the first bandwidth except the subcarriers to which the sequence of the preamble signal is mapped.

In some embodiments, when the preamble signal includes at least two types of sequences, the at least two type of sequences are transmitted in time domain in at least one of the following: a manner of the sequences being alternately transmitted, and a manner of one type of sequence being transmitted and then another type of sequence being transmitted.

A wireless communication method is further provided, including: detecting a preamble signal on a carrier in an unlicensed frequency band from a first time-point; and receiving a downlink signal on the carrier, in response to the preamble signal being successfully detected.

In some embodiments, the detecting a preamble signal on a carrier in an unlicensed frequency band includes: detecting the preamble signal on the carrier in the unlicensed frequency band by a way of sliding window detection. A time-length of each processing in the sliding window detection is a length of an information segment in a preamble signal symbol for sending the preamble signal.

A network device is provided, including a processor and a memory storing a computer program, the processor being configured for calling and performing the computer program stored in the memory to execute: performing channel detection for a carrier in an unlicensed frequency band; and sending a preamble signal on the carrier from a first time-point, in response to the channel detection succeeding, the preamble signal being configured for indicating that the carrier has an ability to transmit a downlink signal.

In some embodiments, the first time-point is determined according to at least one of a format of a preamble signal symbol configured for sending the preamble signal and a time-point at which the channel detection succeeds.

In some embodiments, the first time-point includes at least one of a candidate time-point in the preamble signal symbol and a starting point of the preamble signal symbol.

In some embodiments, the preamble signal symbol is the first preamble signal symbol which is located behind the time-point at which the channel detection succeeds.

In some embodiments, the preamble signal symbol includes a first cyclic prefix (CP) and an information segment; and the first time-point includes a starting point of the first CP in the preamble signal symbol.

In some embodiments, the preamble signal symbol includes a second CP and M information segments, wherein M is a positive integer greater than or equal to 2; and the first time-point includes a starting point of the second CP or any one of the M information segments in the preamble signal symbol.

In some embodiments, the processor is configured for calling and performing the computer program stored in the memory to further execute: sending an occupying signal or a CP of the preamble signal on the carrier from the time-point at which the channel detection succeeds to the first time-point, in response to the first time-point not being the time-point at which the channel detection succeeds.

In some embodiments, the first time-point includes a starting point of a downlink signal symbol configured for sending the downlink signal.

In some embodiments, the processor is configured for calling and performing the computer program stored in the memory to further execute: sending the downlink signal on the carrier from a second time-point, after the preamble signal is sent, wherein the second time-point is a starting point of the downlink signal symbol.

In some embodiments, the preamble signal symbol corresponds to a first subcarrier spacing; and the first subcarrier spacing is a subcarrier spacing greater than or equal to that corresponding to the downlink signal, or a length of the preamble signal symbol is less than or equal to a length of the downlink signal symbol; or the first subcarrier spacing is a subcarrier spacing indicated by at least one of a radio resource control (RRC) signaling, a physical-layer signaling, and a MAC-layer signaling; or the first subcarrier spacing is a predefined subcarrier spacing.

In some embodiments, a time-length for sending the preamble signal is greater than or equal to a length of P preamble signal symbols, and P is a positive integer; or the time-length for sending the preamble signal is greater than or equal to a length of information segments of Q preamble signal symbols, and Q is a positive integer greater than or equal to 2.

In some embodiments, a sequence of the preamble signal is mapped to M contiguous subcarriers on a first bandwidth in frequency domain, wherein a length of the sequence of the preamble signal is M, and M is a positive integer, and a subcarrier spacing of the preamble signal is greater than that of the downlink signal; or a sequence of the preamble signal is mapped to M discrete subcarriers on a first bandwidth in frequency domain, wherein any two adjacent subcarriers in the M discrete subcarriers has a same distance, a length of the sequence of the preamble signal is M, and M is a positive integer, and a subcarrier spacing of the preamble signal is equal to that of the downlink signal; wherein the M subcarriers occupy the full first bandwidth, a central part of the first bandwidth, or a predefined part of the first bandwidth.

In some embodiments, no signal is mapped to other subcarriers on the first bandwidth except the subcarriers to which the sequence of the preamble signal is mapped.

A terminal device is provided, including a processor and a memory storing a computer program, the processor being configured for calling and performing the computer program stored in the memory to execute: detecting a preamble signal on a carrier in an unlicensed frequency band from a first time-point; and receiving a downlink signal on the carrier, in response to the preamble signal being successfully detected.

The technical solutions of embodiments of the present disclosure can be applied to various communication systems such as Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Advanced long term evolution (LTE-A) system, New Radio (NR) system, evolution systems of the NR system, LTE-based access to unlicensed spectrum (LTE-U) system, NR-based access to unlicensed spectrum (NR-U) system, Universal Mobile Telecommunication System (UMTS), Worldwide Interoperability for Microwave Access (WiMAX) communication system, Wireless Local Area Networks (WLAN), Wireless Fidelity (Wi-Fi), the next-generation communication system or other communication systems.

The applied spectrum is not limited in embodiments of the present disclosure. For example, embodiments of present disclosure can be applied to the licensed spectrum, or may be applied to the unlicensed spectrum.

FIG. 1 shows a wireless communication system 100 applied in embodiments of the present disclosure. The wireless communication system 100 may include a network device 110. The network device 100 may be a device that communicates with a terminal device. The network device 100 may provide communication coverage for a specific geographic area, and may communicate with a terminal device (for example, UE) located in the coverage area. Alternatively, the network device 100 may be a base transceiver station (BTS) in a GSM system or a CDMA system, a base station (NodeB or NB) in a WCDMA system, an evolutional base station (NodeB, NB) in an LTE system or an NR system, or a wireless controller in the Cloud Radio Access Network (CRAN). Alternatively, the network device can be a relay station, an access point, an in-vehicle device, a network-side device in 5G network, or a network device in the future evolutional Public Land Mobile Network (PLMN).

The wireless communication system 100 also includes at least one terminal device 120 located within the coverage area of the network device 110. The terminal device 120 may be mobile or fixed. Alternatively, the terminal device 120 may refer to an access terminal, a user equipment (UE), a user unit, a user station, a mobile station, a mobile plate, a remote station, a remote terminal, a mobile equipment, a user terminal, a terminal, a wireless communication equipment, a user agent, or a user device. The access terminal can be a cellular phone, a cordless phone, a Session Initiation Protocol (SIP) phone, a wireless local loop (Wireless Local Loop, WLL) station, a personal digital assistant (PDA), a handheld device with the function of wireless communication, a computing device or other processing devices connected to wireless modems, an in-vehicle device, a wearable device, a terminal device in the future 5G network, or a terminal device in the future evolved PLMN. Alternatively, a Device to Device (D2D) communication may also be performed between the terminal devices 120.

Alternatively, the 5G system or network may also be referred to as the NR system or network.

FIG. 1 exemplarily shows one network device and two terminal devices. Alternatively, the wireless communication system 100 may include multiple network devices, and other numbers of terminal devices are located at a coverage of each network device, which is not limited herein.

Alternatively, the wireless communication system 100 may also include an access and mobility management function (AMF), a session management function (SMF), and a unified data management (UDM) function, an Authentication server function (AUSF), and other network entities, which are not limited herein.

In addition, various aspects or features of present disclosure can be implemented as methods, devices, or products using standard programming and/or engineering techniques. The term "product" as used in present disclosure encompasses a computer program accessible from any computer-readable device, carrier, or medium. For example, the computer-readable media may include, but are not limited to, magnetic storage devices (for example, hard disks, floppy disks, or tapes, etc.), optical disks (for example, compact discs (CD), digital versatile discs (DVD), etc.), smart cards, and flash memory devices (for example, Erasable Programmable Read-Only Memory (EPROM), cards, sticks or key drives, etc.). Further, various storage media described herein may represent one or more device and/or another machine-readable media for storing information. The term "machine-readable media" may include, but is not limited to, various media capable of storing, containing, and/or carrying instructions and/or data.

It should be understood that the terms "system" and "network" in this document are often used interchangeably in this document. The term "and/or" in this document is only an association relationship describing associated objects, which means that there can be three relationships. For example, A and/or B, which can mean that A alone exists, both A and B exist at the same time, and B alone exists. In addition, the character "/" in this document generally indicates that two associated objects are in a relationship of "or".

On the unlicensed spectrum, the network device needs to detect a channel on a carrier before sending a downlink signal to a terminal device. When the network device detects that the channel is in an idle state, it indicates that channel detection succeeds, and the channel can be used for signal transmission. When the channel detection fails, it indicates that the channel cannot be used for signal transmission. Due to the uncertainty of when the network device sends a downlink signal, the terminal device needs to perform blind detection on a downlink signal to determine whether the network device is sending the downlink signal, when receiving the downlink signal. The blind detection of the downlink signal by the terminal device may increase complexity and power consumption of the terminal device.

Embodiments of the present disclosure provide a wireless communication method. A network device may send a preamble signal to assist a terminal device detecting a downlink signal, before sending the downlink signal. The terminal device detects the preamble signal and then receives the downlink signal, which avoids the problem of increased complexity and power consumption resulted from the blind detection of the downlink signal by the terminal device.

It should be understood that a transmission method of the preamble signal in embodiments of the present disclosure can be used for downlink transmission or uplink transmission. For example, when the method in embodiments of the present disclosure is applied to uplink transmission, the terminal device can send an uplink preamble signal before sending an uplink signal. Accordingly, the network device can receive the uplink signal after detecting the uplink preamble signal.

For ease of description, the downlink transmission is taken as an example for description in the embodiments of the present disclosure, and the process of the uplink transmission will not be repeated.

It should be noted that, in the embodiments of the present disclosure, the downlink signal may include a downlink physical channel and a downlink reference signal, where the downlink physical channel may include a physical downlink control channel (PDCCH), a physical downlink shared channel (PDSCH), a physical multicast channel (PMCH), a physical broadcast channel (PBCH), etc. The downlink reference signal may include a downlink synchronization signal, a phase tracking reference signal (PT-RS), a downlink demodulation reference signal (DMRS), and a channel state information reference signal (CSI-RS), etc. It should be understood that the embodiments of the present disclosure may include another downlink physical channel or downlink reference signal with different functions and the same name as the above, and another downlink physical channel or downlink reference signal with different names and the same function as the foregoing, which are not limited.

It should be noted that, in the embodiments of the present disclosure, the uplink signal may include an uplink physical channel and an uplink reference signal, where the uplink physical channel may include a physical random access channel (PRACH), a physical uplink control channel (PUCCH), a physical uplink shared channel (PUSCH), etc. The uplink reference signal may include an uplink demodulation reference signal (DMRS), a sounding reference signal (SRS), a phase tracking reference signal (PT-RS), etc. It should be understood that the embodiments of the present disclosure may include another uplink physical channel or uplink reference signal with different functions and the same name as the above, and another uplink physical channel or uplink reference signal with different names and the same function as the above, which are not limited.

FIG. 2 is a schematic flowchart of a wireless communication method 200 according to some embodiments of the present disclosure. The method in FIG. 2 includes at least part of the following contents.

At block 210, channel detection is performed for a carrier in an unlicensed frequency band.

At block 220, a preamble signal is sent on the carrier from a first time-point, in response to the channel detection succeeding. The preamble signal is used to indicate that the carrier has an ability to transmit a downlink signal.

In the embodiments of the present disclosure, a symbol used for transmitting the preamble signal may be referred to as a preamble signal symbol.

Actual transmission of the preamble signal may not necessarily use a whole symbol, but a part of the symbol can be used to transmit the preamble signal.

For example, given that the preamble signal is transmitted on two preamble signal symbols, but an actual duration for transmitting the preamble signal may be only a length of 1.5 preamble signal symbols. That is, for one symbol, only half thereof is used.

There are many ways to determine the first time-point. As an example, the first time-point may be a time-point in a set of candidate time-points. For example, multiple candidate time-points may be pre-set in a time-length, and one candidate time-point among the multiple candidate time-points may be used as the first time-point. A time-interval between any two adjacent candidate time-points of the candidate time-points may be equal, increased, or decreased, which is not specifically limited in the embodiments of the present disclosure.

As another example, the first time-point may be any time-point in the preamble signal symbol.

As another example, the first time-point may be a time-point determined according to a format of a preamble signal symbol and/or a time-point at which the channel detection succeeds.

It should be noted that the candidate time-points in the embodiments of the present disclosure may also be time-points determined according to the format of the preamble signal symbol and/or the time-point when the channel detection succeeds.

The preamble signal symbol is used to transmit the preamble signal. The preamble signal symbol may include, for example, a cyclic prefix (CP) and an information segment. The information segment may be, for example, data sent by a network device. The CP of the preamble signal may be contents at the tail of the information segment.

Alternatively, a format of preamble signal symbol can indicate at least one of the number of information segments included in the preamble signal symbol, the number of preamble signal symbols, position relationships between the information segment and the CP, a length of the CP, a length of the information segment, and a subcarrier spacing of the preamble signal symbol.

There may be one or more format of the preamble signal symbol. Alternatively, when there are multiple formats of preamble signal symbol, through a high-layer signaling or physical-layer signaling, the network device indicates which of the formats of preamble signal symbol is currently used by a terminal device.

As an example, for a format of preamble signal symbol, a preamble signal symbol includes a first CP and an information segment, and the information segment shares the separate first CP.

As an example, for a format of a preamble signal symbol, the preamble signal symbol includes a second CP and M information segments. The M information segments share the second CP, and M is a positive integer that is greater than or equal to 2. That is, the M information segments are repeatedly sent (which means that signals sent on the M information segments are same).

As an example, a length of the second CP is greater than a length of the first CP.

As an example, the length of the second CP is a length of M first CPs.

A method for determining the first time-point according to a format of preamble signal symbol and/or a time-point at which channel detection succeeds will be described in detail below.

As an example, the first time-point may be a time-point determined according to the format of preamble signal symbol. For example, the first time-point may be a starting point of an information segment, a starting point of a CP, or a starting point of the preamble signal symbol.

As another example, the first time-point may be a time-point determined according to the time-point when the channel detection succeeds. For example, a time-point after a preset period from the time-point when the channel detection succeeds may be used as the first time-point. For example, the first time-point may be the time-point when the channel detection succeeds.

As another example, the first time-point may be determined according to both the format of preamble signal symbol and the time-point when the channel detection succeeds. For example, the first time-point can be a starting point of a preamble signal symbol which is located behind a time-point when the channel detection succeeds, a starting point of a CP which is located behind a time-point when the channel detection succeeds, a starting point of an information segment which is located behind a time-point when the channel detection succeeds, or a starting point of a downlink signal symbol which is located behind a time-point when the channel detection succeeds.

It should be understood that, as described above, the first time-point may be a time-point determined according to the format of preamble signal symbol and/or the time-point when the channel detection succeeds, but it should be understood that it is not limited to this in the embodiments of the present disclosure.

There are many ways to determine a subcarrier spacing of a preamble signal. A way for determining the subcarrier spacing of the preamble signal is described below. In this embodiment of the present disclosure, the subcarrier spacing corresponding to the preamble signal symbol may be referred to as a first subcarrier spacing.

As an example, the first subcarrier spacing may be equal to a subcarrier spacing corresponding to a downlink signal. That is, it can be agreed in the system that the subcarrier spacing of the preamble signal is equal to a subcarrier spacing of the downlink signal. After obtaining the subcarrier spacing of the downlink signal, the network device can directly determine that the subcarrier spacing of the preamble signal is equal to the subcarrier spacing of the downlink signal.

As another example, the first subcarrier spacing may be a subcarrier spacing indicated by at least one of a radio resource control (RRC) signaling, a physical-layer signaling, and a medium access control (MAC) layer signaling.

As another example, the first subcarrier spacing may be a predefined subcarrier spacing. For example, the first subcarrier spacing may be a subcarrier spacing specified in the standard specification.

The first time-point may also be determined based on a format of a downlink signal symbol (which may be a downlink symbol used to transmit PDCCH or PDSCH). For example, a time-point aligned with a starting point of the downlink signal symbol may be determined as the first time-point. The starting point of the downlink signal symbol herein refers to a starting point of the downlink signal symbol corresponding to a subcarrier spacing of the downlink signal, where the subcarrier spacing of the downlink signal may refer to a subcarrier spacing of a downlink signal in actual transmission, or a subcarrier spacing for downlink signal transmission indicated by the network device through at least one of a RRC signaling, a physical layer signaling, and a MAC layer signaling, or a predefined subcarrier spacing.

Alternatively, the subcarrier spacing of the preamble signal (i.e. the first subcarrier spacing) may be greater than or equal to a subcarrier spacing of a downlink signal. Alternatively, a length of the preamble signal symbol may be less than or equal to a length of the downlink signal symbol.

Take the NR system as an example, compared with LTE system, the NR system can support a larger subcarrier spacing, and the configuration of subcarrier spacing is also more flexible. For example, the NR system can support subcarrier spacings including 15 kHz, 30 kHz, 60 kHz, and so on. The greater a subcarrier spacing in the system is, the shorter a symbol used for signal transmission by the system are.

Based on this, if a downlink signal (for example, PDSCH or PDCCH) is blindly detected each time, it will increase the complexity and power consumption of a terminal. In embodiments of the present disclosure, sending the preamble signal, which is used to determine that the current carrier is able to be used to transmit the downlink signal, can reduce the complexity of blind detection of downlink signals by a terminal device, simplify the terminal device, and reduce power consumption.

The format of preamble signal symbol and a method for determining the first time-point will be described in detail below with reference to FIG. 3 to FIG. 6. In FIG. 3 to FIG. 6, a subcarrier spacing of the preamble signal is equal to a subcarrier spacing of 4 downlink signals as an example for description.

It should be noted that in FIG. 3 to FIG. 6, a time-length can be divided according to a length of a downlink signal symbol. That is, lengths of symbol #n and symbol #(n+1) are equal to a length of one downlink signal symbol, respectively.

Alternatively, a format of preamble signal symbol is as shown in FIG. 3. One preamble signal symbol includes a CP and an information segment. The information segment shares the separate CP. The preamble signal symbol can also be called a preamble signal symbol with a CP. Symbol #n includes 4 preamble signal symbols. That is, a length of one downlink signal symbol is equal to a length of 4 preamble signal symbols. Alternatively, lengths of CPs of the last three preamble signal symbols are same and less than a length of CP of the first preamble signal symbol in the 4 preamble signal symbols. Alternatively, each preamble signal symbol in the 4 preamble signal symbols has a same length of CP.

In FIG. 3, when the network device selects a starting point of a CP or a starting point of a preamble signal symbol as the first time-point, the first time-point can be a starting point of any CP (i.e. a time-point as shown by ↓ in FIG. 3). When the network device selects a starting point of the downlink signal symbol as the first time-point, the first time-point can be a starting point of a CP of the first preamble signal symbol (i.e. the time-point indicated by the first ↓ in FIG. 3).

Alternatively, a format of preamble signal symbol may be as shown in FIG. 4. A preamble signal symbol includes a CP and 4 information segments, and the 4 information segments share the CP. A length of one preamble signal symbol is equal to a length of symbol #n. That is, the length of one preamble signal symbol is equal to a length of one downlink signal symbol. A length of one information segment of the downlink signal symbol is equal to a length of 4 information segments of the preamble signal symbol. It should be understood that a length of CP of downlink signal symbol #n and a length of CP of downlink signal symbol #(n+1) may be same or different. For example, when symbol #n is the first symbol or the seventh symbol in a slot, the CP length of symbol #n is greater than a CP length of symbol #(n+1).

In FIG. 4, when the network device selects a starting point of an information segment or a starting point of the CP as the first time-point, the first time-point can be the starting point of the CP, or a starting point of one of the four information segments (i.e. a time-point as shown by ↓ in FIG. 4). When the network device selects a starting point of the preamble signal symbol or a starting point of the downlink signal symbol as the first time-point, the first time-point can be the starting point of the preamble signal symbol (i.e. the time-point as indicated by the first ↓ in FIG. 4).

It should be noted that, in embodiments of present disclosure, a preamble signal symbol in FIG. 4 is understood as a CP and 4 information segments. Of course, there are also other understandings of the preamble signal symbol. For example, in some cases, it can also interpret one information segment in FIG. 4 as a preamble signal, or two information segments in FIG. 4 as a preamble signal (that is, a length of the CP is the same as a length of information segments). The understandings of the preamble signal symbol are not limited to the present disclosure.

Figure 5:
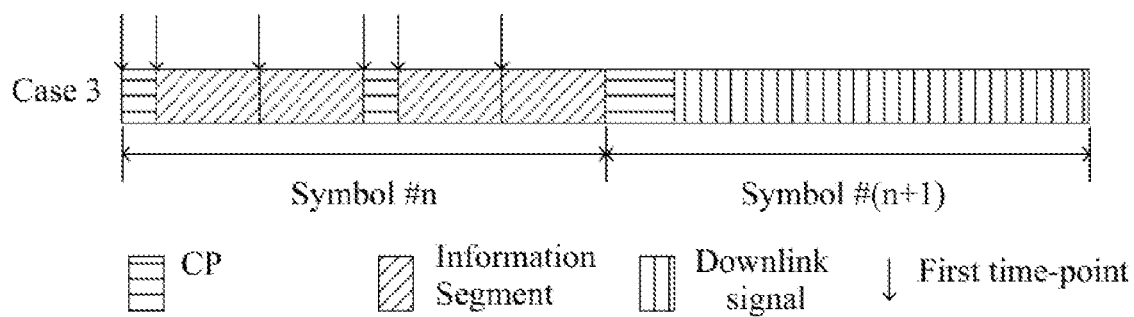
FIG. 5 is a schematic diagram of another method for determining a first time-point according to some embodiments of the present disclosure.

Alternatively, a format of preamble signal symbol may be as shown in FIG. 5. One preamble signal symbol includes a CP and two information segments, and the two information segments share the CP. Symbol #n includes two preamble signal symbols. That is, a length of two preamble signal symbols is equal to a length of one downlink signal symbol.

In FIG. 5, when the network device selects a starting point of an information segment or a starting point of the CP as the first time-point, the first time-point can be the starting point of the CP, or a starting point of one of the four information segments, as shown by ↓ in FIG. 5. When the network device selects a starting point of a preamble signal symbol as the first time-point, the first time-point can be a starting point of one of the two CPs, as shown in the first ↓ or the fourth ↓ in FIG. 5. When the network device selects a starting point of a downlink signal symbol as the first time-point, then the first time-point can be a starting point of the CP of the first preamble signal symbol, as indicated by the first ↓ in FIG. 5.

On a length of one downlink signal symbol, in addition to the above description in which the same format of preamble signal symbol is used to transmit the preamble signal, different formats of the preamble signal symbol can also be used to transmit the preamble signal.

As an example, on a length of one downlink signal symbol, one downlink signal symbol includes a first preamble signal symbol and a second preamble signal symbol, where the first preamble signal symbol includes a CP and three information segments, and the second preamble signal symbol includes a CP and an information segment. At this time, the first time-point may be a starting point of the CP of the first preamble signal symbol, a starting point of an information segment of the first preamble signal symbol, or a starting point of the CP of the second preamble signal symbol.

Figure 6:
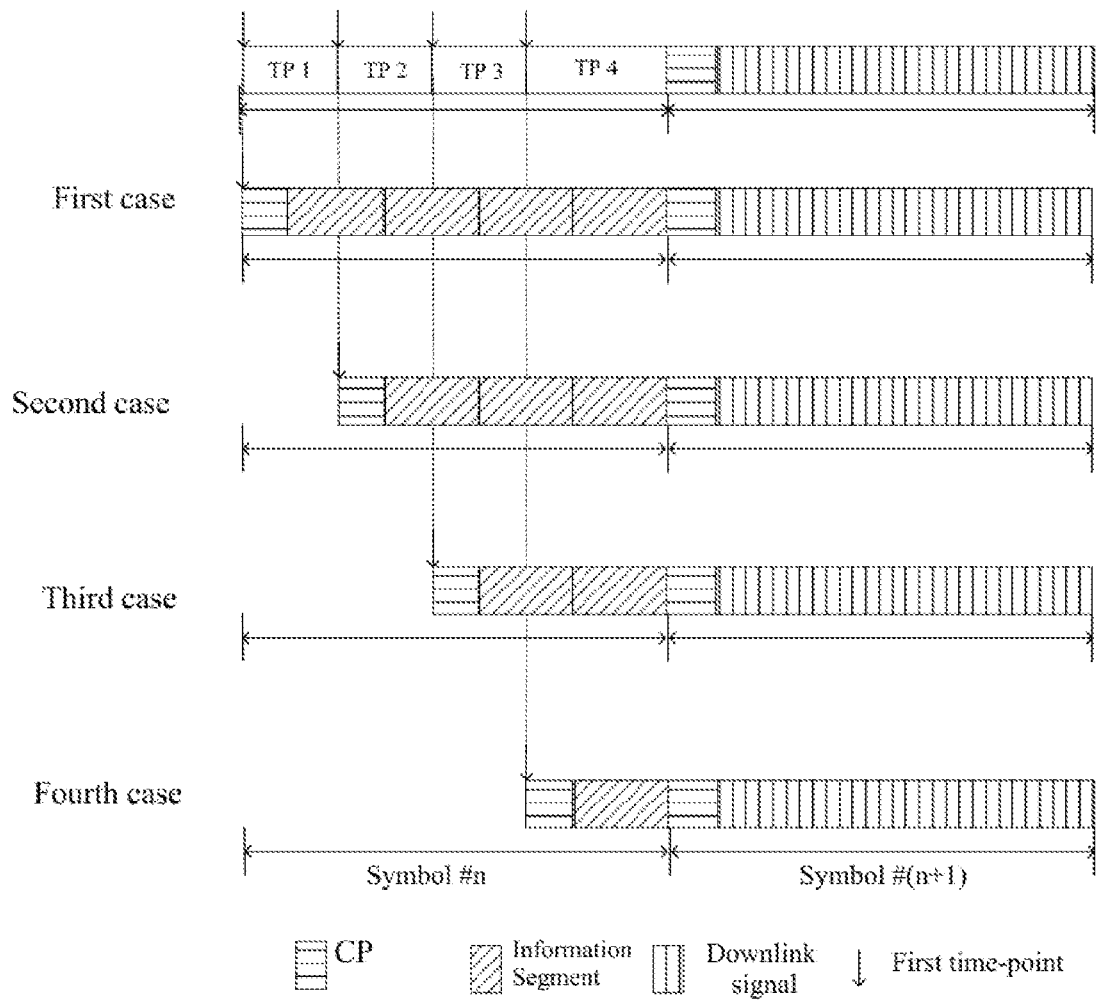
FIG. 6 is a schematic diagram of another method for determining a first time-point according to some embodiments of the present disclosure.

As another example, as shown in FIG. 6, formats of preamble signal symbol used in four cases are different with each other. For example, in the first case, a preamble signal symbol includes a CP and 4 information segments. In the second case, a preamble signal symbol includes a CP and 3 information segments. In the third case, a preamble signal symbol includes a CP and 2 information segments. In the fourth case, a preamble signal symbol includes a CP and an information segment.

A solution shown in FIG. 6 will be described in detail below.

Alternatively, the network device may determine a format of preamble signal symbol according to a time-point when the channel detection succeeds.

The network device may pre-divide the symbol #n into multiple time-periods (TPs), such as time-period 1, time-period 2, time-period 3, and time-period 4, and use a starting point of each time-period as a candidate time-point for the first time-point.

When the time-point when channel detection succeeds is located before the time-period 1, the network device can send a preamble signal starting from a starting point of the time-period 1, as shown in the first case in FIG. 6. At this time, the network device may determine the preamble signal of which a preamble signal symbol includes a CP and (p+3) information segments, where p is a positive integer, indicated by the format of the preamble signal symbol.

In an example of FIG. 6, the network device can send a preamble signal including a CP and 4 information segments starting from a starting point of time-period 1.

When the channel detection succeeds in the time-period 1, the network device can send a preamble signal starting from a starting point of the time-period 2, as shown in the second case in FIG. 6. At this time, the network device may determine the preamble signal of which the preamble signal symbol includes a CP and (p+2) information segments, indicated by the format of preamble signal symbol.

In an example of FIG. 6, the network device can send a preamble signal including a CP and 3 information segments starting from a starting point of the time-period 2.

When the channel detection succeeds in the time-period 2, the network device can send a preamble signal starting from a starting point of the time-period 3, as shown in the third case in FIG. 6. At this time, the network device may determine the preamble signal of which the preamble signal symbol includes a CP and (p+1) of information segments, indicated by the format of preamble signal symbol.

In an example of FIG. 6, the network device can send a preamble signal including a CP and two information segments starting from a starting point of the time-period 3.

When the channel detection succeeds in the time-period 3, the network device can send a preamble signal from a starting point of the time-period 4, as shown in the fourth case in FIG. 6. At this time, the network device may determine the preamble signal of which the preamble signal symbol includes a CP and of p information segments, indicated by the format of preamble signal symbol.

In an example of FIG. 6, the network device can send a preamble signal including a CP and an information segment from a starting point of the time-period 3.

It should be understood that the length of the CP in the first, second, third, and four cases described above may be same or different, which is not limited in present disclosure.

In the above description, a time-length for sending a preamble signal in each case is determined as transmission length of the preamble signal, but the embodiments of the present disclosure are not limited to this. The length of the symbol #n can also be understood as the length of the preamble signal symbol. That is, a symbol for sending a preamble signal is understood as a preamble signal symbol, which is the complete symbol in the first case. A symbol for sending a preamble signal is understood as an in-complete symbol in the second, third, and fourth cases.

Alternatively, the first time-point may be a starting point of the $m^{th}$ CP, or a starting point of the $m^{th}$ information segment, or a starting point of the $m^{th}$ preamble signal symbol, or a starting point of the $m^{th}$ downlink signal symbol, which is located behind a time-point when the successful channel detection, where m is a positive integer.

Alternatively, after the channel detection succeeds, the network device may send a preamble signal at a starting point of the first information segment, or a starting point of the first CP, or a starting point of the first preamble signal symbol, or a starting point of the first downlink signal symbol, which is located behind the successful channel detection.

Alternatively, after the channel detection succeeds, the network device may send a preamble signal at a starting point of the second or more information segment, CP, preamble signal symbol, or downlink signal symbol, which is located behind the successful channel detection.

Alternatively, the transmission length of the preamble signal is a fixed length. For example, the transmission length of the preamble signal is S preamble signal symbols, or the transmission length of the preamble signal is S downlink signal symbols, or the transmission length of the preamble signal is (S+1) information segments, and S is a positive integer.

Alternatively, candidate time-points of the first time-point may be determined according to a starting position of a downlink signal symbol and the transmission length of the preamble signal, where the starting position of the downlink signal symbol is a starting point of one downlink signal symbol in a starting symbol candidate set for downlink transmission. For example, if a starting position of the downlink signal symbol is a starting point of symbol #n, and the transmission length of the preamble signal is S downlink signal symbols, then the first time-point is a starting point of symbol #(n-S). For another example, if the starting position of the downlink signal symbol is a starting point of one of the symbols #2, #6, and #10 in a slot, and the transmission length of the preamble signal is 2 downlink signal symbols, then a candidate time-point of the first time-point is a starting point of one of the symbols #0, #4, and #8 in a slot. The network device can select the first available time-point from the candidate time-points of the first time-point as the first time-point, after the channel detection succeeds.

When the first time-point is a starting point of a downlink signal symbol, it means that no matter where the channel detection succeeds, such as at a starting point, a middle time-point, or the ending point, the preamble signal will be being transmitted starting from a starting position of another downlink signal symbol. For example, when the channel detection succeeds at any position in the middle of a downlink signal symbol, the network device can transmit a downlink signal starting from a starting point of the next downlink signal symbol. Further, a time-length during which a preamble signal is transmitted each time is a fixed length. In this transmission format, a terminal device can detect whether there is a preamble signal at a candidate position of the preamble signal, which can reduce detection complexity of the terminal device. Alternatively, when a time-point at which the channel detection succeeds is the first time-point, the network device may send a preamble signal from the time-point when the channel detection succeeds.

Alternatively, when a time-point at which the channel detection succeeds is not the first time-point, the network device may send an occupying signal from the time-point at which the channel detection succeeds to the first time-point. The occupying signal is used to occupy the successfully-detected channel to prevent other devices from sending data on the channel to occupy the channel. The occupying signal may be, for example, some clutter, noise and other signals.

Alternatively, the occupying signal may be spatially quasi co-located (QCL) with a preamble signal located behind the occupying signal in time domain. For example, based on beams and/or ports for the occupying signal, beams and/or ports for the preamble signal may be derived.

Alternatively, when a time-point at which the channel detection succeeds is not the first time-point, the network device may send a CP of a preamble signal from the time-point at which the channel detection succeeds to the first time-point.

For the convenience of description, the CP of the preamble signal sent between the time-point at which the channel detection succeeds and the first time-point is called an initial CP. The initial CP may be an extended CP of the preamble signal.

In the above description, the initial CP is not regarded as a part of a preamble signal. However, in some cases, the initial CP can be regarded as a part of the preamble signal. That is, the preamble signal includes the initial CP. In this case, the first time-point is the time-point at which the channel detection succeeds, and the network device can send the preamble signal from the time-point at which the channel detection succeeds. That is, the transmission length of the preamble signal is variable.

In this case, the scheme of sending the initial CP can also be described that, the CP of the preamble signal is sent on the carrier, starting from the time-point at which the channel detection succeeds to a starting point of the first CP, the first information segment, or the first preamble signal symbol which is located behind the successful channel detection.

The solution in the embodiments of the present disclosure will be described with reference to FIG. 7 in the following.

Figure 7:
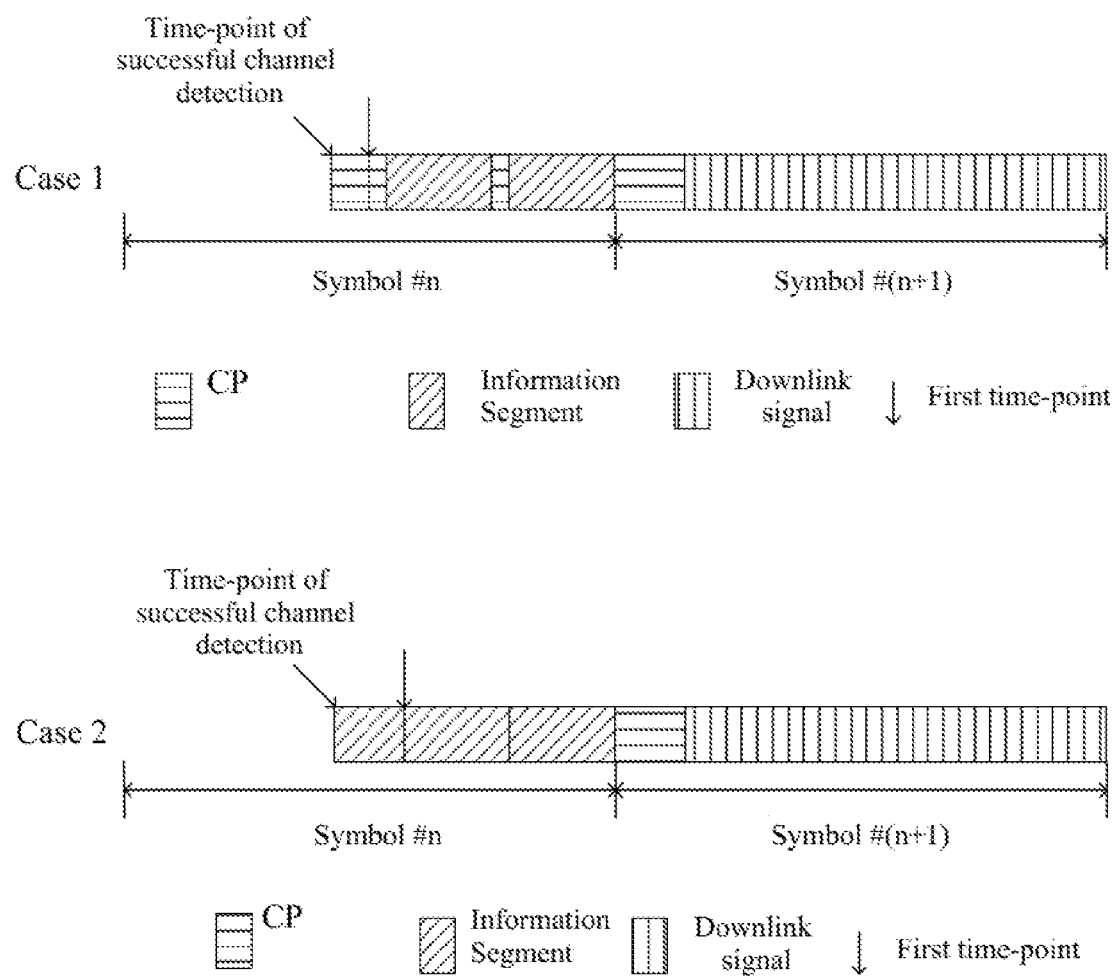
FIG. 7 is a schematic diagram of a method for transmitting a preamble signal according to some embodiments of the present disclosure.

FIG. 7 shows a case where the time-point at which the channel detection succeeds is not the first time-point. A format of preamble signal symbol in Case 1 as shown in FIG. 7 is the same as the format of preamble signal symbol as shown in FIG. 3, and a format of the preamble signal symbol in Case 2 as shown in FIG. 7 is the same as the format of preamble signal symbol as shown in FIG. 4.

As shown in FIG. 7, the network device may adopt a starting point of a CP or a time-point of an information segment as the first time-point. The time-point at which the channel detection succeeds is shown by ↘ in the figure, and the network device can determine a starting point of the CP closest to the time-point at which the channel detection succeeds as the first time-point. That is, the first time-point is shown by ↓ in the figure.

The network device may send the initial CP of the preamble signal from the time-point at which the channel detection succeeds to the first time-point. The network device can send a preamble signal from the first time-point to an ending point of symbol #n.

It should be understood that as the CP is contents that is located at a tail of the information segment. Thus, for the Case 2 shown in FIG. 7, the time-point at which the channel detection succeeds can also be considered as the first time-point, and the network device sends the remaining part of the preamble signal symbol starting from the time-point at which the channel detection succeeds.

Alternatively, when the network device needs to send a preamble signal multiple times, starting points for sending the preamble signal multiple times can all be the starting point of the CP. Also, a part of the starting points is the starting point of the CP, and the other part is not the starting point of the CP. For example, the network device may use the starting point of the CP as the first time-point when sending the preamble signal for the first time, and use a starting point of the information segment, the preamble signal symbol, or the downlink signal symbol as the first time-point when sending the preamble signal for the second time.

Alternatively, a starting point for transmitting the preamble signal is determined according to the time-point at which the channel detection succeeds, and the transmission length of a preamble signal is a variable length.

It should be understood that if the transmission length of a preamble signal is variable, the minimum transmission length of the preamble signal needs to be specified, so that a reception-side can receive the preamble signal correctly.

Alternatively, a time-length for sending the preamble signal is greater than or equal to a length of P preamble signal symbols. Alternatively, the time-length for sending the preamble signal is greater than or equal to a length of P downlink signal symbols. Alternatively, the time-length for sending the preamble signal is greater than or equal to a length of Q information segments of the preamble signal symbol. P is a positive integer, and Q is a positive integer greater than or equal to 2.

Alternatively, an ending point for sending the preamble signal may be an ending point of a downlink signal symbol.

Alternatively, the time-length for sending the preamble signal is less than or equal to a length of R downlink signal symbols, where R is a positive integer, and when the time-length for sending the preamble signal is greater than or equal to a length of P downlink signal symbols, R is greater than P.

Alternatively, the P, Q, or R may be predefined, or may be sent by the network device to a terminal device through one of an RRC signaling, a physical-layer signaling, and a MAC layer signaling.

Case 1 of FIG. 7 is described as an example. In the format of preamble signal symbol shown in Case 1, when the first time-point is determined as a starting point of CP of the third preamble signal symbol in the downlink signal symbol #n according to the time-point at which the channel detection succeeds, if P is a length of 2 preamble signal symbols and R is a length of 1 downlink signal symbol, then a duration for sending the preamble signal is from the first time-point to the ending point of symbol #n, and if P is a length of 1 downlink signal symbol and R is a length of 2 downlink signal symbols, then the duration for sending the preamble signal is from the first time-point to an ending point of symbol #(n+1). That is, when a time interval between the time-point at which channel detection succeeds and a starting point of symbol #(n+1) is less than a length of one downlink signal symbol, the network device needs to continue to transmit the preamble signal on symbol #(n+1).

Case 2 of FIG. 7 is described as an example. In the format of preamble signal symbol shown in Case 2, a length of a preamble signal symbol is equal to a length of a downlink signal symbol, and the first time-point is the time-point at which the channel detection succeeds. If Q is a length of information segments of 2 preamble signal symbol, and R is a length of 1 downlink signal symbol, then a duration for sending the preamble signal is from the first time-point to the ending point of symbol #n. If P is a length of 1 downlink signal symbol or a length of 1 preamble signal symbol, and R is a length of 2 downlink signal symbols, then a duration for sending the preamble is from the first time-point to the ending point of symbol #(n+1). That is, when a time interval between the time-point at which channel detection succeeds and a starting point of symbol #(n+1) is less than a length of one downlink signal symbol, the network device needs to continue to transmit the preamble signal on symbol #(n+1).

Alternatively, when the preamble signal includes N types of sequences, a time-length for sending the preamble signal is greater than or equal to a length of 2*N information segments, or the time-length for sending the preamble signal is greater than or equal to N preamble signal symbols (with CPs), or the time-length for sending the preamble signal is greater than or equal to a length of N downlink signal symbols, wherein N is a positive integer.

Alternatively, the time-length for transmitting the preamble signal is a fixed length, and when the preamble signal includes N types of sequences, the transmission length of the preamble signal is S*N preamble signal symbols, or the transmission length of the preamble signal is S*N downlink signals, or the transmission length of the preamble signal is (S+1)*N information segments, where S is a positive integer.

Alternatively, after sending the preamble signal, the network device sends a downlink signal on a channel where the channel detection succeeds starting from a second time-point.

In some cases, the network device may send a downlink signal to a terminal device after sending the preamble signal. At this time, the second time-point is an ending point at which the preamble signal has been sent.

In other cases, the network device sends a preamble signal, and then waits for a response signal of the preamble signal from a terminal device, instead of sending a downlink signal. After receiving the response signal of the preamble signal sent by the terminal device, the network device sends a downlink signal to the terminal device. If the network device does not receive the response signal of the preamble signal sent by the terminal device, the network device may choose not to send the downlink signal.

The time domain characteristics of the preamble signal are described above, and the frequency domain characteristics of the preamble signal are described below.

When a length of a sequence of the preamble signal is M, the sequence of the preamble signal can be mapped to M subcarriers on a first bandwidth in frequency domain, and M is a positive integer.

Alternatively, a value of M is preset.

Alternatively, the first bandwidth is a bandwidth configured by the network device for a terminal device for downlink signal transmission, or the first bandwidth is a bandwidth configured and activated by the network device for the terminal device for downlink signal transmission.

Alternatively, a size of the first bandwidth may be an integer multiple of a sub-band channel detection bandwidth. For example, the sub-band channel detection bandwidth is 20 MHz, and the size of the first bandwidth may be 20 MHz, 40 MHz, 60 MHz, 80 MHz, etc. The sub-band channel detection bandwidth is a unit bandwidth used for channel detection. The preamble signal may be transmitted on each bandwidth with the size of the first bandwidth. That is, when the frequency domain of the unlicensed spectrum is divided into multiple bandwidths according to the size of the first bandwidth, the preamble signal is transmitted on each divided bandwidth.

The embodiments of the present disclosure do not specifically limit a manner in which the sequence of the preamble signal is mapped to the M subcarriers on the first bandwidth. As an example, sequence elements of the preamble signal are mapped to M contiguous subcarriers on the first bandwidth in frequency domain. As another example, the sequence elements of the preamble signal are mapped to M discrete subcarriers on the first bandwidth in the frequency domain.

Alternatively, a starting position at which the sequence of the preamble signal is mapped in frequency domain is preset, or indicated by the network device to a terminal device through a signaling.

It should be understood that when the preamble signal includes multiple sequences, the multiple sequences may be respectively mapped to different symbols on the first bandwidth.

Alternatively, the M subcarriers may occupy the full first bandwidth, a central part of the first bandwidth, or a predefined part of the first bandwidth.

Alternatively, a sequence of a preamble signal may be mapped to M discrete subcarriers on the first bandwidth in frequency domain. Alternatively, mapping positions of the M discrete subcarriers in frequency domain are preset, or a distance between any two adjacent subcarriers in the M discrete subcarriers is equal and a size of the distance is preset. Alternatively, no signal is mapped to other subcarriers on the first bandwidth, except the M subcarriers to which the sequence of the preamble signal is mapped. Through this mapping manner, the preamble signal is represented by repeated information segments in time domain, and the shorter an information segment of the preamble signal can be generated, compared with a symbol length corresponding to the subcarrier spacing of the preamble signal. For example, assuming that the subcarrier spacing of the preamble signal is 15 kHz, the corresponding symbol length is 1/15 kHz=66.7 microseconds, and the distance between two adjacent subcarriers is k (e.g. k=4) subcarriers when sequence elements of the preamble signal are mapped to subcarriers, then the preamble signal is represented by k (i.e. 4) repeated information segments of the preamble signal within 66.7 microseconds in time domain. Since a length of the information segments of the preamble signal is relatively short, the processing complexity of a terminal device can be reduced.

Alternatively, a sequence of a preamble signal may be mapped to M contiguous subcarriers of the first bandwidth in the frequency domain. Alternatively, no signal is mapped on other subcarriers on the first bandwidth, except the M subcarriers to which the sequence of the preamble signal is mapped. Through this mapping manner, when detecting a preamble signal, a terminal device can directly process it in time domain without transforming it to the frequency domain to process, which reduces the processing complexity of the terminal device. In addition, if a large subcarrier spacing is selected for transmitting the preamble signal, for example, the subcarrier spacing of the preamble signal is greater than a subcarrier spacing of a downlink signal, a shorter information segment of the preamble signal can also be obtained, which can further reduce the processing complexity of the terminal device.

Figure 8:
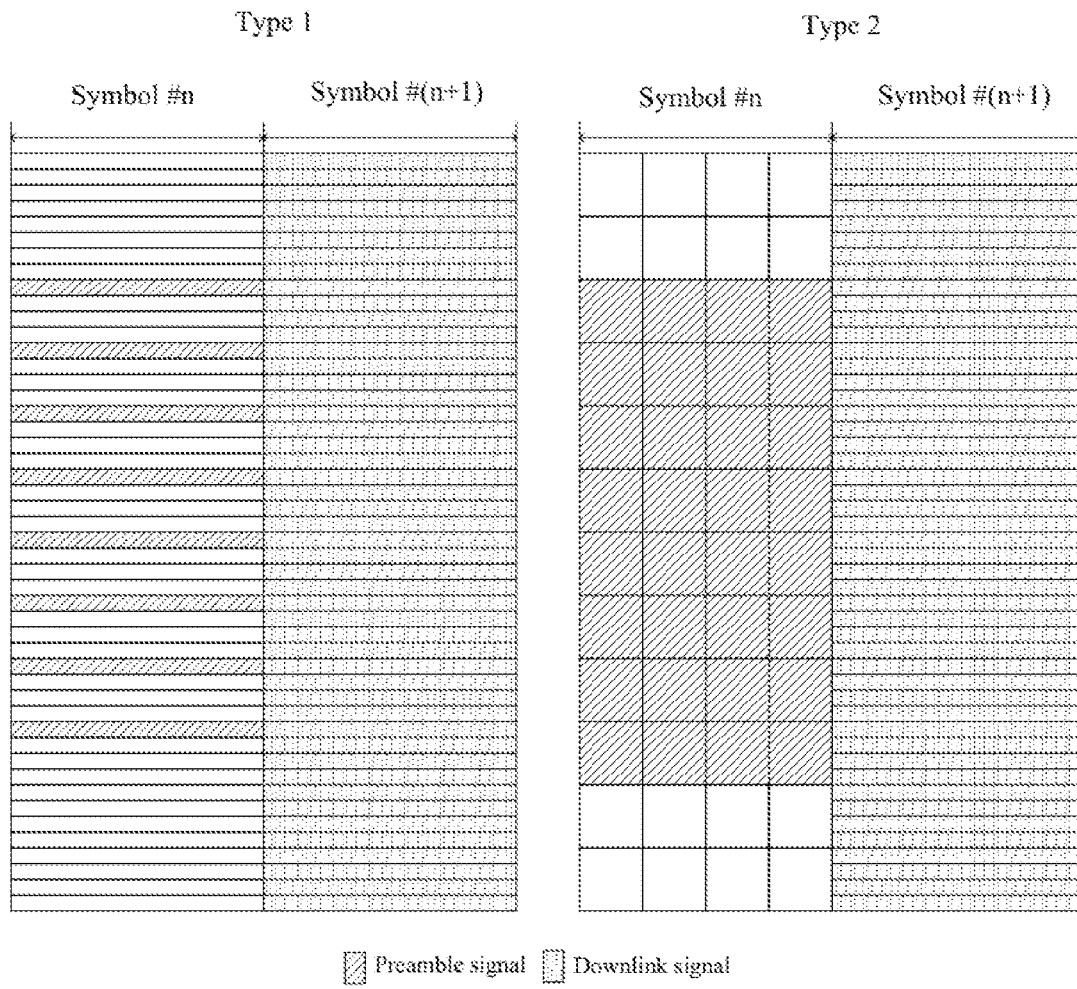
FIG. 8 is a schematic diagram of a mapping manner of a sequence of a preamble signal in frequency domain according to some embodiments of the present disclosure.
Figures 9, 10:
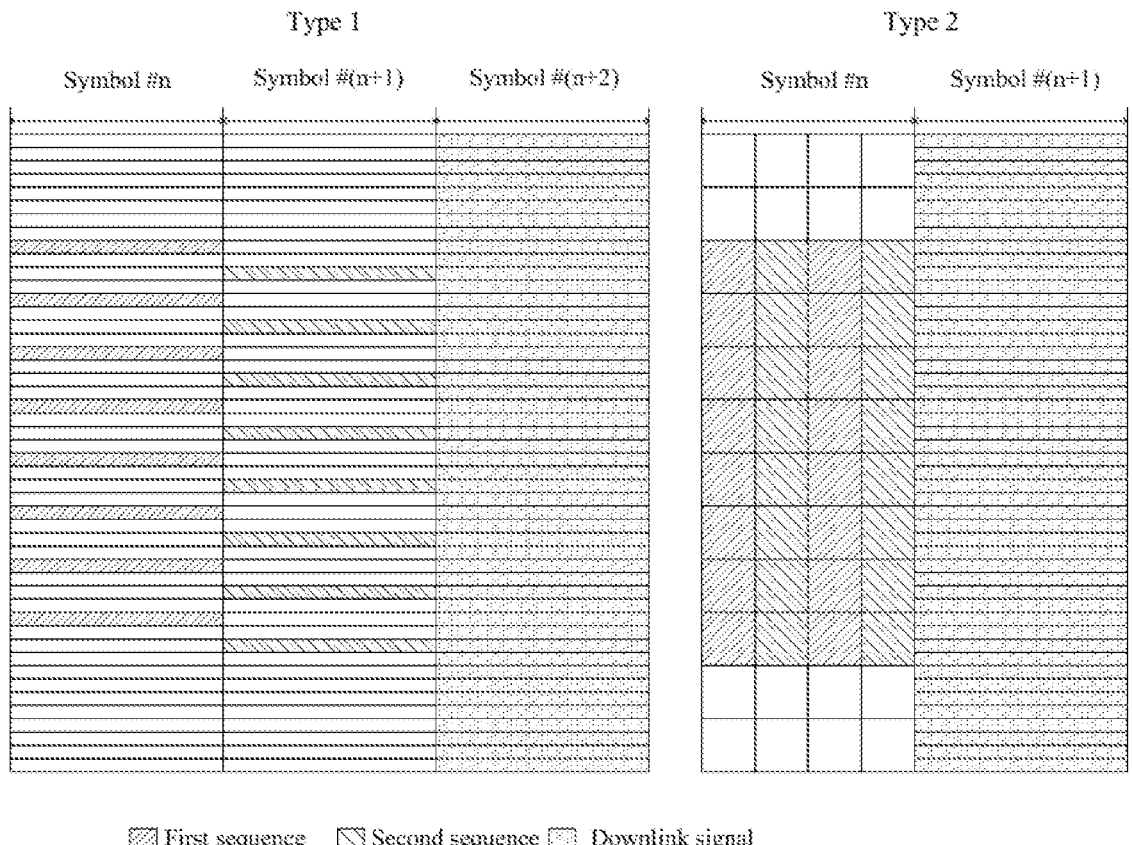
FIG. 9 is a schematic diagram of another mapping manner of a sequence of a preamble signal in frequency domain according to some embodiments of the present disclosure.
FIG. 10 is a schematic flowchart of another wireless communication method according to some embodiments of the present disclosure.

The following describes the mapping manner of the sequence of the preamble signal with reference to FIGS. 8-9.

FIG. 8 is a schematic diagram of a mapping manner of a preamble signal in frequency domain when the preamble signal includes a type of sequence.

As an example, a subcarrier spacing of a preamble signal is equal to a subcarrier spacing of a downlink signal, and the sequence of the preamble signal is mapped to M discrete subcarriers on the first bandwidth in frequency domain. For example, both the preamble signal and the downlink signal are transmitted on the first bandwidth, the preamble signal is transmitted on symbol #n, and the downlink signal is transmitted on symbol #(n+1). A length of the sequence of the preamble signal is 8, and the preamble signal can be mapped to 8 subcarriers on the first bandwidth. The 8 subcarriers can be discrete subcarriers. As shown in Type 1 of FIG. 8, each two adjacent subcarriers in 8 subcarriers has a distance of 4 subcarriers.

Alternatively, the 8 subcarriers may be distributed at the center of the first bandwidth, may also be distributed on the full first bandwidth, or may also be distributed on predefined subcarriers. The distribution on the full first bandwidth may mean that the 8 subcarriers are evenly or equally distributed on the first bandwidth.

As an example, a subcarrier spacing of a preamble signal is greater than a subcarrier spacing of a downlink signal, and the sequence of the preamble signal is mapped to M contiguous sub-carriers on the first bandwidth in frequency domain. For example, both the preamble signal and the downlink signal are transmitted on the first bandwidth, the preamble signal is transmitted on symbol #n, and the downlink signal is transmitted on symbol #(n+1). A size of the subcarrier spacing of the preamble signal is equal to 4 times a size of the subcarrier spacing of the downlink signal, a length of symbol #n is equal to a length of 4 preamble signal symbols, and the preamble signal is transmitted on each symbol.

A length of the sequence of the preamble signal is 8, the preamble signal can be mapped to 8 subcarriers on the first bandwidth, and the 8 subcarriers can be contiguous subcarriers. The sequence elements of the preamble signal are mapped on the 8 subcarriers of each of the 4 preamble signal symbols, as shown in Type 2 of FIG. 8.

Alternatively, the 8 subcarriers may be distributed at the center of the first bandwidth, may also be distributed on the full first bandwidth, or may also be distributed on predefined subcarriers. The distribution on the full first bandwidth may mean that the 8 subcarriers are evenly or equally distributed on the first bandwidth.

As an example, a subcarrier spacing of a preamble signal is equal to a subcarrier spacing of a downlink signal, and the sequence of the preamble signal is mapped to M contiguous sub-carriers on the first bandwidth in frequency domain. For example, when both the subcarrier spacing of the preamble signal and the subcarrier spacing of the downlink signal are 60 kHz, the sequence of the preamble signal adopts the mapping manner to contiguous subcarriers, and then a shorter information segment of the preamble signal symbol is obtained.

As an example, a subcarrier spacing of a preamble signal is less than a subcarrier spacing of a downlink signal, and the sequence of the preamble signal is mapped to M discrete subcarriers of the first bandwidth in the frequency domain. In this case, an interval for which sequence elements of the preamble signal are mapped in frequency domain can be increased to achieve the purpose of obtaining a shorter information segment of the preamble signal symbol. For example, if the subcarrier spacing of the preamble signal is 30 kHz and the subcarrier spacing of the downlink signal is 60 kHz, then a distance between two mapped adjacent subcarriers can be greater than or equal to the subcarrier spacing of the downlink signal, when the sequence of the preamble signal is mapped to discrete subcarriers on the first bandwidth in frequency domain. For example, the distance is two sub-carriers with 30 kHz). Thus, a shorter information segment of the preamble signal symbol can be obtained.

It should be understood that when the preamble signal includes multiple types of sequences, the mapping manner of each sequence in frequency domain may adopt one of the above-mentioned mapping manners in frequency domain. The mapping manners of multiple sequences in the frequency domain may be the same or different, which is not limited in present disclosure.

FIG. 9 is a schematic diagram of a mapping manner of a preamble signal in frequency domain when the preamble signal includes two types of sequences.

As an example, the preamble signal includes a first sequence and a second sequence. The first sequence is transmitted on symbol #n, the second sequence is transmitted on symbol #(n+1), and the downlink signal is transmitted on symbol #(n+2).

The mapping manner of the first sequence on the first bandwidth of symbol #n and the mapping manner of the second sequence on the first bandwidth of symbol #(n+1) are same as the mapping manner of Type 1 in FIG. 8, which is will not be described in detail here with avoiding cumbersomeness.

Alternatively, the first sequence and the second sequence may be mapped to the same subcarriers, or may be mapped to different subcarriers. Type 1 in FIG. 9 shows a situation where the first sequence and the second sequence are mapped to different subcarriers, and the subcarriers to which the first sequence is mapped may be shifted by 2 subcarriers, compared with that to which the second sequence is mapped.

As an example, in Type 2, since a subcarrier spacing of the preamble signal is greater than a subcarrier spacing of a downlink signal, both the first sequence and the second sequence may be transmitted on the symbol #n. The symbol #n includes 4 preamble signal symbols, and the first sequence and the second sequence can be alternately transmitted on the symbol #n. That is, the 4 preamble signal symbols successively transmit the first sequence, the second sequence, the first sequence, and the second sequence, or the 4 preamble signal symbols sequentially transmit the second sequence, the first sequence, the second sequence, and the first sequence.

Alternatively, the first sequence and the second sequence may be transmitted in an order, and the transmission order of the first sequence and the second sequence may be that one type of sequence has been transmitted and then another type of sequence is transmitted. The 4 preamble signal symbols can sequentially transmit the first sequence, the first sequence, the second sequence, and the second sequence, or the 4 preamble signal symbols can sequentially transmit the second sequence, the second sequence, the first sequence, and the first sequence.

Assuming that the time-point at which the channel detection succeeds is a starting point of the second preamble signal symbol of symbol #n, alternate transmission of the first sequence and the second sequence is adopt, and the complete first sequence and second sequence can be transmitted on symbol #n. At this time, the network device can directly transmit a downlink signal on the symbol #(n+1). This can shorten a time interval between the time-point at which the channel detection succeeds and the transmission of the downlink signal, and is helpful to improve the transmission efficiency of the communication system.

It should be noted that FIG. 9 shows a case where a length of the first sequence is equal to that of the second sequence, but the embodiments of the present disclosure is not limited to this, and the length of the first sequence may also be different from that of the second sequence.

In FIG. 8 and FIG. 9, the mapping manner to 8 discrete subcarriers shown in Type 1 can achieve an effect of the mapping to 8 contiguous subcarriers shown in Type 2. The size of a subcarrier corresponding to a preamble signal symbol in Type 2 is equal to the size of a subcarrier corresponding to 4 preamble signal symbols in Type 1, and the length of the preamble signal symbol in Type 1 is equal to the length of the 4 preamble signal symbols in Type 2. When the same preamble signal is mapped to M contiguous subcarriers on the 4 preamble signal symbols in Type 2, its effect can be achieved same as that of which the preamble signal is mapped to M discrete subcarriers on one preamble signal symbol of Type 1.

In addition, FIG. 8 and FIG. 9 only schematically show a size of the first bandwidth to which the preamble signal is mapped. In practice, the number of subcarriers included in the first bandwidth depends on actual situations.

Alternatively, when a type of sequence of the preamble signal includes multiple candidate sequences, the multiple candidate sequences may be mutually orthogonal.

Alternatively, the sequence of the preamble signal may be a primary synchronization signal (PSS) sequence and/or a secondary synchronization signal (SSS) sequence. Thus, the PSS sequence and/or the SSS sequence can be reused.

Alternatively, the sequence of the preamble signal may be another sequence newly introduced, such as the Zadoff-Chu (ZC) sequence. The ZC sequence can be scrambled using a cell identity (ID) scrambling code, which enables a terminal device to determine that the network device of the cell has obtained the right to use the channel in the unlicensed frequency band after receiving the preamble signal.

Alternatively, the sequence of the preamble signal is common to the cell, common to a group, or unique to the terminal device.

Alternatively, signals transmitted on the preamble signal includes data bits obtained after the original information bits are coded, wherein a mapping manner of the data bits after modulation in frequency domain is one of the foregoing mapping manners in frequency domain.

Alternatively, the preamble signal carries at least one of a cell ID, a public land mobile network (PLMN) ID, a request to send (RTS) identifier, a clear to send (CTS) identifier, a position of the downlink signal in time domain, and channel occupation time.

Alternatively, after detecting the preamble signal in the unlicensed spectrum, the terminal device receives a downlink signal (such as PDCCH or PDSCH) according to a predefined rule.

Alternatively, the position of the downlink signal in time domain may indicate that, after receiving the preamble signal, the terminal device receives a downlink signal (such as PDCCH or PDSCH) at the corresponding position according to the information carried in the preamble signal.

Alternatively, an antenna port for a preamble signal may be an omnidirectional antenna port or a directional antenna port.

For example, when the channel detection is non-directional channel detection, the antenna port for transmitting the preamble signal may be an omnidirectional antenna port or a directional antenna port. For another example, when the channel detection is directional channel detection, the antenna port for transmitting the preamble signal is a directional antenna port in a direction corresponding to the directional channel detection.

Alternatively, the antenna port for transmitting the preamble signal is the same as the antenna port for transmitting a synchronization signal block (SSB).

Alternatively, the preamble signal is QCL with the SSB or downlink signal behind the preamble signal in time domain. In other words, the transmission or reception beam and/or port corresponding to the SSB or downlink signal can be derived according to the transmission or reception beam and/or port corresponding to the preamble signal, or the transmission or reception beam and/or port corresponding to the preamble signal can be derived according to the transmission or reception beam and/or port corresponding to the SSB or downlink signal.

Transmission parameters of the preamble signal can be indicated to the terminal device in one of an RRC configuration, a physical broadcast channel (PBCH), and remaining minimized system information (RMSI).

Alternatively, a manner in which the transmission parameters of the preamble signal is indicated is the same as that of transmission parameters of a PRACH.

Alternatively, for a license assisted access (LAA) scenario, the transmission parameters of the preamble signal may be indicated to a terminal device through the carriers in the licensed spectrum.

The transmission parameters of the preamble signal may include, but are not limited to, time domain characteristics, frequency domain characteristics, sequence characteristics, antenna port, and configuration of the preamble signal as described above.

Alternatively, the embodiments of the present disclosure facilitate a terminal device to perform AGC adjustment, and there is a certain relationship between reception power for which the terminal device receives a preamble signal and reception power for which the terminal device receives a downlink signal. Specifically, after receiving the preamble signal sent by the network device, the terminal device can adaptively adjust the reception power of the downlink signal according to the reception power for receiving the preamble signal.

Therefore, in the embodiments of the present disclosure, sending a preamble signal, which is used for determining that the current carrier has an ability to transmit a downlink signal, can reduce the complexity of blind detection of the downlink signal by a terminal device, simplify the terminal device, and reduce power consumption.

FIG. 10 is a schematic flowchart of another wireless communication method according to some embodiments of the present disclosure. The method in FIG. 10 includes at least part of the following content.

At block 1010, a preamble signal is detected on a carrier in an unlicensed frequency band.

At block 1020, a downlink signal is received on the carrier, in response to the preamble signal being successfully detected.

The downlink signal may be, for example, PDCCH or PDSCH.

If the terminal device can correctly receive and demodulate the preamble signal, it indicates that the preamble signal is successful detected.

Alternatively, at block 1020, the downlink signal is further received on the carrier from a first time-point.

In the embodiments of the present disclosure, a symbol used for transmitting the preamble signal may be referred to as a preamble signal symbol.

Actual transmission of the preamble signal may not necessarily use a whole symbol, but a part of the symbol can be used to transmit the preamble signal.

For example, given that the preamble signal is transmitted on two preamble signal symbols, but an actual duration for transmitting the preamble signal may be only a length of 1.5 preamble signal symbols. That is, for one symbol, only half thereof is used.

There are many ways to determine the first time-point. As an example, the first time-point may be a time-point in a set of candidate time-points. For example, multiple candidate time-points may be pre-set in a time-length, and one candidate time-point among the multiple candidate time-points may be used as the first time-point. A time-interval between any two adjacent candidate time-points of the candidate time-points may be equal, increased, or decreased, which is not specifically limited in the embodiments of the present disclosure.

As another example, the first time-point may be any time-point in the preamble signal symbol.

As another example, the first time-point may be a time-point determined according to a format of preamble signal symbol.

Alternatively, the terminal device may obtain the format of preamble signal symbol in advance, and then determine the first time-point according to the format of preamble signal symbol.

It should be noted that candidate time-points in the embodiments of the present disclosure may also be time-points determined according to the format of preamble signal symbol.

The preamble signal symbol is used to transmit the preamble signal. The preamble signal symbol may include, for example, a CP and an information segment. The information segment may be, for example, data sent by a network device. The CP of the preamble signal may be contents at the tail of the information segment.

Alternatively, a format of preamble signal symbol can indicate at least one of the number of information segments included in the preamble signal symbol, the number of preamble signal symbols, position relationships between the information segment and the CP, a length of the CP, a length of the information segment, and a subcarrier spacing of the preamble signal symbol.

There may be one or more format of the preamble signal symbol. Alternatively, when there are multiple formats of preamble signal symbol, through a high-layer signaling or physical-layer signaling, the network device indicates which of the formats of preamble signal symbol is currently used by a terminal device.

As an example, for a format of preamble signal symbol, a preamble signal symbol includes a first CP and an information segment, and the information segment shares the separate first CP.

As an example, for a format of a preamble signal symbol, the preamble signal symbol includes a second CP and M information segments. The M information segments share the second CP, and M is a positive integer that is greater than or equal to 2. That is, the M information segments are repeatedly sent (which means that signals sent on the M information segments are same).

As an example, a length of the second CP is greater than a length of the first CP.

As an example, the length of the second CP is a length of M first CPs.

A method for determining the first time-point according to a format of preamble signal symbol will be described in detail below.

For example, the first time-point may be a starting point of an information segment, a starting point of a CP, or a starting point of the preamble signal symbol.

It should be understood that, as described above, the first time-point may be a time-point determined according to the format of preamble signal symbol, but it should be understood that it is not limited to this in the embodiments of the present disclosure.

There are many ways to determine a subcarrier spacing of a preamble signal. A way for determining the subcarrier spacing of the preamble signal is described below. In this embodiment of the present disclosure, the subcarrier spacing corresponding to the preamble signal symbol may be referred to as a first subcarrier spacing.

As an example, the first subcarrier spacing may be equal to a subcarrier spacing corresponding to a downlink signal. That is, it can be agreed in the system that the subcarrier spacing of the preamble signal is equal to a subcarrier spacing of the downlink signal. After obtaining the subcarrier spacing of the downlink signal, the terminal device can directly determine that the subcarrier spacing of the preamble signal is equal to the subcarrier spacing of the downlink signal.

As another example, the first subcarrier spacing may be a subcarrier spacing indicated by at least one of an RRC signaling, a physical-layer signaling, and a MAC layer signaling.

As another example, the first subcarrier spacing may be a predefined subcarrier spacing. For example, the first subcarrier spacing may be a subcarrier spacing specified in the standard specification.

The first time-point may also be determined based on a format of a downlink signal symbol (which may be a downlink symbol used to transmit PDCCH or PDSCH). For example, a time-point aligned with a starting point of the downlink signal symbol may be determined as the first time-point. The starting point of the downlink signal symbol herein refers to a starting point of the downlink signal symbol corresponding to a subcarrier spacing of the downlink signal, where the subcarrier spacing of the downlink signal may refer to a subcarrier spacing of a downlink signal in actual transmission, or a subcarrier spacing for downlink signal transmission indicated by a network device through at least one of a RRC signaling, a physical layer signaling, and a MAC layer signaling, or a predefined subcarrier spacing.

Alternatively, the subcarrier spacing of the preamble signal (i.e. the first subcarrier spacing) may be greater than or equal to a subcarrier spacing of a downlink signal. Alternatively, a length of the preamble signal symbol may be less than or equal to a length of the downlink signal symbol.

Take the NR system as an example, compared with LTE system, the NR system can support a larger subcarrier spacing, and the configuration of subcarrier spacing is also more flexible. For example, the NR system can support subcarrier spacings including 15 kHz, 30 kHz, 60 kHz, and so on. The greater a subcarrier spacing in the system is, the shorter a symbol used for signal transmission by the system are.

Based on this, if a downlink signal (for example, PDSCH or PDCCH) is blindly detected each time, it will increase the complexity and power consumption of a terminal device. In embodiments of the present disclosure, sending the preamble signal, which is used to determine that the current carrier is able to be used to transmit the downlink signal, can reduce the complexity of blind detection of downlink signals by the terminal device, simplify the terminal device, and reduce power consumption.

The format of preamble signal symbol and a method for determining the first time-point will be described in detail below with reference to FIG. 3 to FIG. 6. In FIG. 3 to FIG. 6, a subcarrier spacing of the preamble signal is equal to a subcarrier spacing of 4 downlink signals as an example for description.

It should be noted that in FIG. 3 to FIG. 6, a time-length can be divided according to a length of a downlink signal symbol. That is, lengths of symbol #n and symbol #(n+1) are equal to a length of one downlink signal symbol, respectively.

Alternatively, a format of preamble signal symbol is as shown in FIG. 3. One preamble signal symbol includes a CP and an information segment. The information segment shares the separate CP. The preamble signal symbol can also be called a preamble signal symbol with a CP. Symbol #n includes 4 preamble signal symbols. That is, a length of one downlink signal symbol is equal to a length of 4 preamble signal symbols. Alternatively, lengths of CPs of the last three preamble signal symbols are same and less than a length of CP of the first preamble signal symbol in the 4 preamble signal symbols. Alternatively, each preamble signal symbol in the 4 preamble signal symbols has a same length of CP.

In FIG. 3, when the terminal device selects a starting point of a CP or a starting point of a preamble signal symbol as the first time-point, the first time-point can be a starting point of any CP (i.e. a time-point as shown by ↓ in FIG. 3). The terminal device can detect a preamble signal starting from the starting point of any CP. When the terminal device selects a starting point of a downlink signal symbol as the first time-point, the first time-point can be a starting point of a CP of the first preamble signal symbol (i.e. the time-point indicated by the first ↓ in FIG. 3). The terminal device can detect the preamble signal starting from a starting point of one downlink signal symbol.

Alternatively, a format of preamble signal symbol may be as shown in FIG. 4. A preamble signal symbol includes a CP and 4 information segments, and the 4 information segments share the CP. A length of one preamble signal symbol is equal to a length of symbol #n. That is, the length of one preamble signal symbol is equal to a length of one downlink signal symbol. A length of an information segment of one downlink signal symbol is equal to a length of 4 information segments of the preamble signal symbol. It should be understood that a length of CP of downlink signal symbol #n and a length of CP of downlink signal symbol #(n+1) may be same or different. For example, when symbol #n is the first symbol or the seventh symbol in a slot, the CP length of symbol #n is greater than a CP length of symbol #(n+1).

In FIG. 4, when the terminal device selects a starting point of an information segment or a starting point of the CP as the first time-point, the first time-point can be the starting point of the CP, or a starting point of one of the four information segments (i.e. a time-point as shown by ↓ in FIG. 4). The terminal device can detect a preamble signal starting from the starting point of the CP, or the starting point of one of the four information segments. When the terminal device selects a starting point of the preamble signal symbol or a starting point of the downlink signal symbol as the first time-point, the first time-point can be the starting point of the preamble signal symbol (i.e. the time-point as indicated by the first ↓ in FIG. 4). The terminal device can detect a preamble signal starting from the starting point of the preamble signal symbol.

It should be noted that, in embodiments of present disclosure, a preamble signal symbol in FIG. 4 is understood as a CP and 4 information segments. Of course, there are also other understandings of the preamble signal symbol. For example, in some cases, it can also interpret one information segment in FIG. 4 as a preamble signal, or two information segments in FIG. 4 as a preamble signal (that is, a length of the CP is the same as a length of information segments). The understandings of the preamble signal symbol are not limited to the present disclosure.

Alternatively, a format of preamble signal symbol may be as shown in FIG. 5. One preamble signal symbol includes a CP and two information segments, and the two information segments share the CP. Symbol #n includes two preamble signal symbols. That is, a length of two preamble signal symbols is equal to a length of one downlink signal symbol.

In FIG. 5, when the network device selects a starting point of an information segment or a starting point of the CP as the first time-point, the first time-point can be the starting point of the CP, or a starting point of one of the four information segments, as shown by ↓ in FIG. 5. When the network device selects a starting point of a preamble signal symbol as the first time-point, the first time-point can be a starting point of one of the two CPs, as shown in the first ↓ or the fourth ↓ in FIG. 5. When the network device selects a starting point of a downlink signal symbol as the first time-point, then the first time-point can be a starting point of the CP of the first preamble signal symbol, as indicated by the first ↓ in FIG. 5.

On a length of one downlink signal symbol, in addition to the above description in which the same format of preamble signal symbol is used to transmit the preamble signal, different formats of the preamble signal symbol can also be used to transmit the preamble signal.

As an example, on a length of one downlink signal symbol, one downlink signal symbol includes a first preamble signal symbol and a second preamble signal symbol, where the first preamble signal symbol includes a CP and three information segments, and the second preamble signal symbol includes a CP and an information segment. At this time, the first time-point may be a starting point of the CP of the first preamble signal symbol, a starting point of an information segment of the first preamble signal symbol, or a starting point of the CP of the second preamble signal symbol.

As another example, as shown in FIG. 6, formats of preamble signal symbol used in four cases are different with each other. For example, in the first case, a preamble signal symbol includes a CP and 4 information segments. In the second case, a preamble signal symbol includes a CP and 3 information segments. In the third case, a preamble signal symbol includes a CP and 2 information segments. In the fourth case, a preamble signal symbol includes a CP and an information segment.

The terminal device can learn different formats of preamble signal symbol included in a downlink signal symbol in advance, and determine the first time-point according to the different formats. That is, which time-point is determined to start detecting the preamble signal.

The solution shown in FIG. 6 will be described in detail below.

The terminal device may pre-divide the symbol #n into multiple time-periods, such as time-period 1, time-period 2, time-period 3, and time-period 4, and use a starting point of each time-period as a candidate time-point for the first time-point.

The terminal device can choose to detect the preamble signal from a starting point of any time-period.

In an example of FIG. 6, the terminal device may detect the preamble signal in a time interval from a starting point of the time-period 1 to an ending point of the symbol #n.

Alternatively, the terminal device may detect the preamble signal in a time interval from a starting point of the time-period 2 to an ending point of the symbol #n.

Alternatively, the terminal device may detect the preamble signal in a time interval from a starting point of the time-period 3 to an ending point of the symbol #n.

Alternatively, the terminal device may detect the preamble signal in a time interval from a starting point of the time-period 4 to an ending point of the symbol #n.

When the first time-point is a starting point of a downlink signal symbol, it means that the terminal device detects the preamble signal from a starting position of a downlink signal symbol to an ending position of the downlink signal symbol. In this way, it can be ensured that different terminal devices have the same time-length for detecting the preamble signal. In the case of independent network SA, this is helpful for the terminal device to complete synchronization.

Alternatively, in addition to detecting the preamble signal from the preset first time-point as described above, the terminal device may also detect the preamble signal by means of sliding window detection.

Alternatively, a time-length of each processing in the sliding window detection is a length of an information segment in the preamble signal symbol. In this way, it is beneficial to increase the probability for which the terminal device detects the preamble signal.

Alternatively, the time-length of each processing may also be referred to as a window length of a time window, and the terminal device may set the window length to be a length of one information segment in one preamble signal symbol.

A time-length for the terminal device to detect the preamble signal is greater than or equal to a length of P preamble signal symbols, and P is a positive integer. Alternatively, the time-length for the terminal device to detect the preamble signal is greater than or equal to a length of Q information segments of a preamble signal symbol, Q is a positive integer greater than or equal to 2.

It should be understood that if a time-length for detecting the preamble signal is variable, the minimum length for detecting the preamble signal needs to be specified, so that the terminal device can correctly receive the preamble signal.

Alternatively, an ending point for detecting the preamble signal may be an ending point of a downlink signal symbol.

Alternatively, a time-length for detecting the preamble signal is greater than or equal to a length of P preamble signal symbols. Alternatively, the time-length for detecting the preamble signal is greater than or equal to a length of P downlink signal symbols. Alternatively, the time-length for sending the preamble signal is greater than or equal to a length of Q information segments of the preamble signal symbol. P is a positive integer, and Q is a positive integer greater than or equal to 2.

Alternatively, the P, Q, or R may be predefined, or may be sent by the network device to the terminal device through one of an RRC signaling, a physical-layer signaling, and a MAC layer signaling.

Alternatively, when the preamble signal includes N types of sequences, a time-length for the terminal device to detect the preamble signal is greater than or equal to a length of 2*N information segments, or the time-length for the terminal device to detect the preamble signal is greater than or equal to N preamble signal symbols (with CPs), or the time-length for the terminal device to detect the preamble signal is greater than or equal to a length of N downlink signal symbols, wherein N is a positive integer.

Alternatively, the time-length for transmitting the preamble signal is a fixed length, and when the preamble signal includes N types of sequences, a time-length for detecting the preamble signal is S*N preamble signal symbols, or the time-length for detecting the preamble signal is S*N downlink signals, or the time-length for detecting the preamble signal is (S+1)*N information segments, where S is a positive integer.

Alternatively, after detecting the preamble signal, the terminal device receives a downlink signal on a channel where the channel detection succeeds starting from a second time-point.

In some cases, the terminal device may receive a downlink signal after detecting the preamble signal. At this time, the second time-point is a time-point at which the preamble signal has been detected successfully.

In other cases, the terminal device detects the preamble signal, and then sends a response signal of the preamble signal to a network device, instead of receiving a downlink signal. After sending the response signal of the preamble signal, the terminal device receives a downlink signal. If the terminal device does not send the response signal of the preamble signal, the terminal device may choose not to receive the downlink signal.

The time domain characteristics of the preamble signal are described above, and the frequency domain characteristics of the preamble signal are described below.

When a length of a sequence of the preamble signal is M, the sequence of the preamble signal can be mapped to M subcarriers on a first bandwidth in frequency domain, and M is a positive integer.

Alternatively, a value of M is preset.

Alternatively, the first bandwidth is a bandwidth configured by the network device for a terminal device for downlink signal transmission, or the first bandwidth is a bandwidth configured and activated by the network device for the terminal device for downlink signal transmission.

Alternatively, a size of the first bandwidth may be an integer multiple of a sub-band channel detection bandwidth. For example, the sub-band channel detection bandwidth is 20 MHz, and the size of the first bandwidth may be 20 MHz, 40 MHz, 60 MHz, 80 MHz, etc. The sub-band channel detection bandwidth is a unit bandwidth used for channel detection. The preamble signal may be transmitted on each bandwidth with the size of the first bandwidth. That is, when the frequency domain of the unlicensed spectrum is divided into multiple bandwidths according to the size of the first bandwidth, the preamble signal is transmitted on each divided bandwidth.

The embodiments of the present disclosure do not specifically limit a manner in which the sequence of the preamble signal is mapped to the M subcarriers on the first bandwidth. As an example, sequence elements of the preamble signal are mapped to M contiguous subcarriers on the first bandwidth in frequency domain. The terminal device can receive the preamble signal on the M contiguous subcarriers. As another example, the sequence elements of the preamble signal are mapped to M discrete subcarriers on the first bandwidth in the frequency domain.

Alternatively, a starting position at which the sequence of the preamble signal is mapped in frequency domain is preset, or indicated by the network device to a terminal device through a signaling.

It should be understood that when the preamble signal includes multiple sequences, the multiple sequences may be respectively mapped to different symbols on the first bandwidth.

Alternatively, the M subcarriers may occupy the full first bandwidth, a central part of the first bandwidth, or a predefined part of the first bandwidth.

Alternatively, the terminal device may determine the number of subcarriers and positions of subcarriers occupied by the preamble signal in frequency domain through a high-level signaling, and then receive the preamble signal at the corresponding positions.

Alternatively, a sequence of a preamble signal may be mapped to M discrete subcarriers on the first bandwidth in frequency domain. Alternatively, mapping positions of the M discrete subcarriers in frequency domain are preset, or a distance between any two adjacent subcarriers in the M discrete subcarriers is equal and a size of the distance is preset. Alternatively, no signal is mapped to other subcarriers on the first bandwidth, except the M subcarriers to which the sequence of the preamble signal is mapped. Through this mapping manner, the preamble signal is represented by repeated information segments in time domain, and the shorter an information segment of the preamble signal can be generated, compared with a symbol length corresponding to the subcarrier spacing of the preamble signal. For example, assuming that the subcarrier spacing of the preamble signal is 15 kHz, the corresponding symbol length is 1/15 kHz=66.7 microseconds, and the distance between two adjacent subcarriers is k (e.g. k=4) subcarriers when sequence elements of the preamble signal are mapped to subcarriers, then the preamble signal is represented by k (i.e. 4) repeated information segments of the preamble signal within 66.7 microseconds in time domain. Since a length of the information segments of the preamble signal is relatively short, the processing complexity of a terminal device can be reduced.

Alternatively, a sequence of a preamble signal may be mapped to M contiguous subcarriers of the first bandwidth in the frequency domain. Alternatively, no signal is mapped on other subcarriers on the first bandwidth, except the M subcarriers to which the sequence of the preamble signal is mapped. Through this mapping manner, when detecting a preamble signal, a terminal device can directly process it in time domain without transforming it to the frequency domain to process, which reduces the processing complexity of the terminal device. In addition, if a large subcarrier spacing is selected for transmitting the preamble signal, for example, the subcarrier spacing of the preamble signal is greater than a subcarrier spacing of a downlink signal, a shorter information segment of the preamble signal can also be obtained, which can further reduce the processing complexity of the terminal device.

The following describes the mapping manner of the sequence of the preamble signal with reference to FIGS. 8-9.

FIG. 8 is a schematic diagram of a mapping manner of a preamble signal in frequency domain when the preamble signal includes a type of sequence.

As an example, a subcarrier spacing of a preamble signal is equal to a subcarrier spacing of a downlink signal, and the sequence of the preamble signal is mapped to M discrete subcarriers on the first bandwidth in frequency domain. For example, both the preamble signal and the downlink signal are transmitted on the first bandwidth, the preamble signal is transmitted on symbol #n, and the downlink signal is transmitted on symbol #(n+1). A length of the sequence of the preamble signal is 8, and the preamble signal can be mapped to 8 subcarriers on the first bandwidth. The 8 subcarriers can be discrete subcarriers. As shown in Type 1 of FIG. 8, each two adjacent subcarriers in the 8 subcarriers has a distance of 4 subcarriers. The terminal device can receive the preamble signal on the 8 discrete subcarriers Alternatively, the 8 subcarriers may be distributed at the center of the first bandwidth, may also be distributed on the full first bandwidth, or may also be distributed on predefined subcarriers. The distribution on the full first bandwidth may mean that the 8 subcarriers are evenly or equally distributed on the first bandwidth. The terminal device can receive the preamble signal on the center of the first bandwidth, the full first bandwidth, or predefined subcarriers.

As another example, a subcarrier spacing of a preamble signal is greater than a subcarrier spacing of a downlink signal, and the sequence of the preamble signal is mapped to M contiguous sub-carriers on the first bandwidth in frequency domain. For example, both the preamble signal and the downlink signal are transmitted on the first bandwidth, the preamble signal is transmitted on symbol #n, and the downlink signal is transmitted on symbol #(n+1). A size of the subcarrier spacing of the preamble signal is equal to 4 times a size of the subcarrier spacing of the downlink signal, a length of symbol #n is equal to a length of 4 preamble signal symbols, and the preamble signal is transmitted on each symbol.

A length of the sequence of the preamble signal is 8, the preamble signal can be mapped to 8 subcarriers on the first bandwidth, and the 8 subcarriers can be contiguous subcarriers. The sequence elements of the preamble signal are mapped on the 8 subcarriers of each of the 4 preamble signal symbols, as shown in Type 2 of FIG. 8.

Alternatively, the 8 subcarriers may be distributed at the center of the first bandwidth, may also be distributed on the full first bandwidth, or may also be distributed on predefined subcarriers. The distribution on the full first bandwidth may mean that the 8 subcarriers are evenly or equally distributed on the first bandwidth.

As an example, a subcarrier spacing of a preamble signal is equal to a subcarrier spacing of a downlink signal, and the sequence of the preamble signal is mapped to M contiguous sub-carriers on the first bandwidth in frequency domain. For example, when both the subcarrier spacing of the preamble signal and the subcarrier spacing of the downlink signal are 60 kHz, the sequence of the preamble signal adopts the mapping manner to contiguous subcarriers, and then a shorter information segment of the preamble signal symbol is obtained.

As an example, a subcarrier spacing of a preamble signal is less than a subcarrier spacing of a downlink signal, and the sequence of the preamble signal is mapped to M discrete subcarriers of the first bandwidth in the frequency domain. In this case, an interval for which sequence elements of the preamble signal are mapped in frequency domain can be increased to achieve the purpose of obtaining a shorter information segment of the preamble signal symbol. For example, if the subcarrier spacing of the preamble signal is 30 kHz and the subcarrier spacing of the downlink signal is 60 kHz, then a distance between two mapped adjacent subcarriers can be greater than or equal to the subcarrier spacing of the downlink signal, when the sequence of the preamble signal is mapped to discrete subcarriers on the first bandwidth in frequency domain. For example, the distance is two sub-carriers with 30 kHz). Thus, a shorter information segment of the preamble signal symbol can be obtained.

It should be understood that when the preamble signal includes multiple types of sequences, the mapping manner of each sequence in frequency domain may adopt one of the above-mentioned mapping manners in frequency domain. The mapping manners of multiple sequences in the frequency domain may be the same or different, which is not limited in present disclosure.

FIG. 9 is a schematic diagram of a mapping manner of a preamble signal in frequency domain when the preamble signal includes two types of sequences.

As an example, the preamble signal includes a first sequence and a second sequence. The first sequence is transmitted on symbol #n, the second sequence is transmitted on symbol #(n+1), and the downlink signal is transmitted on symbol #(n+2).

The mapping manner of the first sequence on the first bandwidth of symbol #n and the mapping manner of the second sequence on the first bandwidth of symbol #(n+1) are same as the mapping manner of Type 1 in FIG. 8, which is will not be described in detail here with avoiding cumbersomeness.

Alternatively, the first sequence and the second sequence may be mapped to the same subcarriers, or may be mapped to different subcarriers. Type 1 in FIG. 9 shows a situation where the first sequence and the second sequence are mapped to different subcarriers, and the subcarriers to which the first sequence is mapped may be shifted by 2 subcarriers, compared with that to which the second sequence is mapped. The terminal device may receive the first sequence of the preamble signal on a carrier to which the first sequence is mapped, and receive the second sequence of the preamble signal on a carrier to which the second sequence is mapped In Type 2, since a subcarrier spacing of the preamble signal is greater than a subcarrier spacing of a downlink signal, both the first sequence and the second sequence may be transmitted on the symbol #n. The symbol #n includes 4 preamble signal symbols, and the first sequence and the second sequence can be alternately transmitted on the symbol #n. That is, the 4 preamble signal symbols successively transmit the first sequence, the second sequence, the first sequence, and the second sequence, or the 4 preamble signal symbols sequentially transmit the second sequence, the first sequence, the second sequence, and the first sequence.

Alternatively, the terminal device can detect the preamble signal from a starting point of the first, second, or third preamble signal symbol in the four preamble signal symbols, and the preamble signal can be successfully detected.

Alternatively, the first sequence and the second sequence may be transmitted in an order, and the transmission order of the first sequence and the second sequence may be that one type of sequence has been transmitted and then another type of sequence is transmitted. The 4 preamble signal symbols can sequentially transmit the first sequence, the first sequence, the second sequence, and the second sequence, or the 4 preamble signal symbols can sequentially transmit the second sequence, the second sequence, the first sequence, and the first sequence.

Alternatively, the terminal device can detect the preamble signal from a starting point of the first preamble signal symbol in the four preamble signal symbols, and the preamble signal can be successfully detected.

Assuming that the terminal device detects a downlink preamble signal starting from a starting point of the second preamble signal symbol of symbol #n, alternate transmission of the first sequence and the second sequence is adopt, and the complete first sequence and second sequence can be detected on symbol #n. At this time, the terminal device can directly receive a downlink signal on the symbol #(n+1). This can increase probability of which the preamble signal is successfully detected, and is helpful to improve the transmission efficiency of the communication system.

It should be noted that FIG. 9 shows a case where a length of the first sequence is equal to that of the second sequence, but the embodiments of the present disclosure is not limited to this, and the length of the first sequence may also be different from that of the second sequence.

In FIG. 8 and FIG. 9, the mapping manner to 8 discrete subcarriers shown in Type 1 can achieve an effect of the mapping to 8 contiguous subcarriers shown in Type 2. The size of a subcarrier corresponding to a preamble signal symbol in Type 2 is equal to the size of a subcarrier corresponding to 4 preamble signal symbols in Type 1, and the length of the preamble signal symbol in Type 1 is equal to the length of the 4 preamble signal symbols in Type 2. When the same preamble signal is mapped to M contiguous subcarriers on the 4 preamble signal symbols in Type 2 and transmitted, its effect can be achieved same as that of which the preamble signal is mapped to M discrete subcarriers on one preamble signal symbol of Type 1.

In addition, FIG. 8 and FIG. 9 only schematically show a size of the first bandwidth to which the preamble signal is mapped. In practice, the number of subcarriers included in the first bandwidth depends on actual situations.

Alternatively, when a type of sequence of the preamble signal includes multiple candidate sequences, the multiple candidate sequences may be mutually orthogonal.

Alternatively, the sequence of the preamble signal may be a PSS sequence and/or a SSS sequence. Thus, the PSS sequence and/or the SSS sequence can be reused.

Alternatively, the sequence of the preamble signal may be another sequence newly introduced, such as the Zadoff-Chu (ZC) sequence. The ZC sequence can be scrambled using a cell identity (ID) scrambling code, which enables the terminal device to determine that the network device of the cell has obtained the right to use the channel in the unlicensed frequency band after receiving the preamble signal.

Alternatively, the sequence of the preamble signal is common to the cell, common to a group, or unique to the terminal device.

Alternatively, signals transmitted on the preamble signal includes data bits obtained after the original information bits are coded, wherein a mapping manner of the data bits after modulation in frequency domain is one of the foregoing mapping manners in frequency domain.

Alternatively, the preamble signal carries at least one of a cell ID, a PLMN ID, an RTS identifier, a CTS identifier, a position of the downlink signal in time domain, and channel occupation time.

Alternatively, after detecting the preamble signal in the unlicensed spectrum, the terminal device receives a downlink signal (such as PDCCH or PDSCH) according to a predefined rule.

Alternatively, the position of the downlink signal in time domain may indicate that, after receiving the preamble signal, the terminal device receives a downlink signal (such as PDCCH or PDSCH) at the corresponding position according to the information carried in the preamble signal.

Alternatively, an antenna port for a preamble signal may be an omnidirectional antenna port or a directional antenna port.

Alternatively, the antenna port for transmitting the preamble signal is the same as the antenna port for transmitting an SSB.

Alternatively, the preamble signal is QCL with the SSB or downlink signal behind the preamble signal in time domain. In other words, the reception beam and/or port corresponding to the SSB or downlink signal can be derived according to the reception beam and/or port corresponding to the preamble signal, or the transmission or reception beam and/or port corresponding to the preamble signal can be derived according to the transmission or reception beam and/or port corresponding to the SSB or downlink signal.

The terminal device obtains transmission parameters of the preamble signal in one of an RRC configuration, a PBCH, and RMSI.

Alternatively, a manner in which the transmission parameters of the preamble signal is indicated is the same as that of transmission parameters of a PRACH.

Alternatively, for a LAA scenario, the transmission parameters of the preamble signal may be indicated to the terminal device through the carriers in the licensed spectrum.

The transmission parameters of the preamble signal may include, but are not limited to, time domain characteristics, frequency domain characteristics, sequence characteristics, antenna port, and configuration of the preamble signal as described above.

Alternatively, the embodiments of the present disclosure facilitate a terminal device to perform AGC adjustment, and there is a certain relationship between reception power for which the terminal device receives a preamble signal and reception power for which the terminal device receives a downlink signal. Specifically, after receiving the preamble signal sent by the network device, the terminal device can adaptively adjust the reception power of the downlink signal according to the reception power for receiving the preamble signal.

Therefore, in the embodiments of the present disclosure, sending a preamble signal, which is used for determining that the current carrier has an ability to transmit a downlink signal, can reduce the complexity of blind detection of the downlink signal by a terminal device, simplify the terminal device, and reduce power consumption.

The wireless communication method according to embodiments of the present disclosure is described in detail above. A device according to embodiments of the present disclosure will be described below with reference to FIG. 11 to FIG. 15. The technical features described in the method are applicable to the following device.

Figure 11:
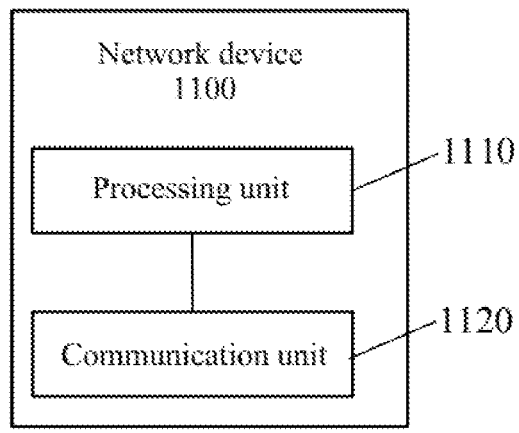
FIG. 11 is a schematic diagram of a network device according to some embodiments of the present disclosure.

FIG. 11 is a schematic diagram of a network device 1100 according to some embodiments of the present disclosure. As shown in FIG. 11, the network device includes a processing unit 1110 and a communication unit 1120.

The processing unit 1110 is configured for performing channel detection for a carrier in an unlicensed frequency band.

The communication unit 1120 is configured for sending a preamble signal on the carrier from a first time-point, in response to the channel detection succeeding, the preamble signal being configured for indicating that the carrier has an ability to transmit a downlink signal.

Alternatively, the first time-point is determined according to a format of a preamble signal symbol and/or a time-point at which the channel detection succeeds.

Alternatively, the first time-point includes a candidate time-point in a preamble signal symbol.

Alternatively, the first time-point includes a starting point of a preamble signal symbol.

Alternatively, the first time-point includes a starting point of the first preamble signal symbol which is located behind a time-point at which the channel detection succeeds.

Alternatively, the first time-point includes a starting point of a cyclic prefix (CP) or an information segment in a preamble signal symbol.

Alternatively, the first time-point includes a starting point of the first CP or the first information segment which is located behind a time-point at which the channel detection succeeds.

Alternatively, a preamble signal symbol includes a first CP and an information segment.

Alternatively, the first time-point includes a starting point of the first CP in the preamble signal symbol.

Alternatively, a preamble signal symbol includes a second CP and M information segments, wherein M is a positive integer greater than or equal to 2.

Alternatively, the first time-point includes a starting point of the second CP or one of the M information segments in the preamble signal symbol.

Alternatively, the communication unit 1120 is further configured for sending an occupying signal on the carrier from a time-point at which the channel detection succeeds to the first time-point, in response to the first time-point not being the time-point at which the channel detection succeeds.

Alternatively, the communication unit 1120 is further configured for sending a CP of the preamble signal on the carrier from the time-point at which the channel detection succeeds to the first time-point, in response to the first time-point not being the time-point at which the channel detection succeeds.

Alternatively, the first time-point includes a starting point of a downlink signal symbol.

Alternatively, the communication unit 1120 is further configured for sending a downlink signal on the carrier from a second time-point, after the preamble signal is sent.

Alternatively, the second time-point is a starting point of a downlink signal symbol.

Alternatively, a preamble signal symbol corresponds to a first subcarrier spacing; and the first subcarrier spacing is a subcarrier spacing corresponding to the downlink signal; or the first subcarrier spacing is a subcarrier spacing indicated by at least one of a radio resource control (RRC) signaling, a physical-layer signaling, and a MAC-layer signaling; or the first subcarrier spacing is a predefined subcarrier spacing.

Alternatively, a time-length for sending the preamble signal is greater than or equal to a length of P preamble signal symbols, and P is a positive integer; or the time-length for sending the preamble signal is greater than or equal to a length of information segments of Q preamble signal symbols, and Q is a positive integer greater than or equal to 2.

Alternatively, the preamble signal includes N types of sequences, and N is a positive integer.

Alternatively, a subcarrier spacing of the preamble signal is greater than or equal to that of the downlink signal; or a length of a preamble signal symbol is less than or equal to a length of the downlink signal symbol.

Alternatively, a sequence of the preamble signal is mapped to M contiguous subcarriers on a first bandwidth in frequency domain, wherein a length of the sequence of the preamble signal is M, and M is a positive integer.

Alternatively, a subcarrier spacing of the preamble signal is greater than that of the downlink signal.

Alternatively, a sequence of the preamble signal is mapped to M discrete subcarriers on a first bandwidth in frequency domain, wherein any two adjacent subcarriers in the M discrete subcarriers has a same distance, a length of the sequence of the preamble signal is M, and M is a positive integer.

Alternatively, a subcarrier spacing of the preamble signal is equal to that of the downlink signal.

Alternatively, the M subcarriers occupy the full first bandwidth, a central part of the first bandwidth, or a predefined part of the first bandwidth.

Alternatively, no signal is mapped to other subcarriers on the first bandwidth except the subcarriers to which the sequence of the preamble signal is mapped.

Alternatively, when the preamble signal includes at least two types of sequences, the at least two type of sequences are alternately transmitted in time domain.

Alternatively, when the preamble signal includes at least two types of sequences, the at least two types of sequences are transmitted in time domain in a manner of one type of sequence being transmitted and then another type of sequence being transmitted.

Alternatively, a sequence of the preamble signal is at least one of a primary synchronization signal (PSS) sequence, a secondary synchronization signal (SSS) sequence, and a Zadoff-Chu sequence.

Alternatively, a sequence of the preamble signal is common to a cell, common to a group, or unique to a terminal device.

Alternatively, the preamble signal carries at least one of a cell identifier (ID), a public land mobile network (PLMN) ID, an RTS identifier, a CTS identifier, a position of the downlink signal in time domain, and channel occupation time.

Alternatively, when the channel detection is non-directional channel detection, an antenna port for transmitting the preamble signal is an omnidirectional antenna port or directional antenna port; or when the channel detection is directional channel detection, the antenna port for transmitting the preamble signal is a directional antenna port in a direction corresponding to the directional channel detection.

Alternatively, the antenna port for transmitting the preamble signal is same as that for transmitting a synchronization signal block (SSB).

Alternatively, the preamble signal is spatially quasi-co-located (QCL) with an SSB or downlink control channel (PDCCH) located behind the preamble signal in time domain.

Alternatively, transmission parameters of the preamble signal are indicated to a terminal device in one way of a RRC, a PBCH, and a RMSI.

Alternatively, transmission parameters of the preamble signal are indicated in a way same as that in which transmission parameters of the PRACH are indicated.

Figure 12:
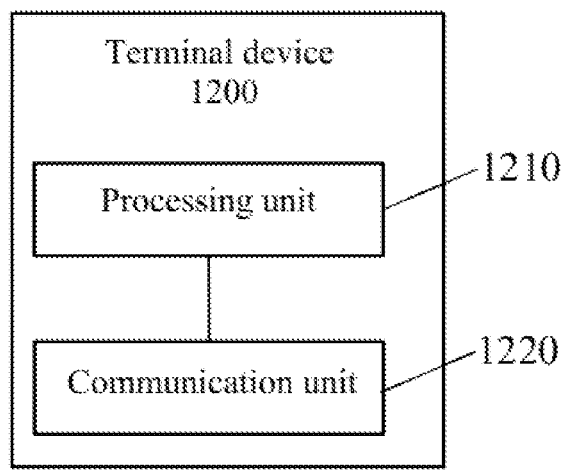
FIG. 12 is a schematic diagram of a terminal device according to some embodiments of the present disclosure.

FIG. 12 is a schematic diagram of a terminal device according to some embodiments of the present disclosure. As shown in FIG. 12, the terminal device 1200 includes a processing unit 1210 and a communication unit 1220.

The processing unit 1210 is configured for detecting a preamble signal on a carrier in an unlicensed frequency band.

The communication unit 1220 is configured for receiving a downlink signal on the carrier, in response to the preamble signal being successfully detected.

Alternatively, the processing unit is configured for detecting the preamble signal on the carrier in the unlicensed frequency band from a first time-point.

Alternatively, the first time-point is determined according to a format of a preamble signal symbol.

Alternatively, the first time-point comprises a candidate time-point in a preamble signal symbol.

Alternatively, the first time-point comprises a starting point of a preamble signal symbol.

Alternatively, the first time-point comprises a starting point of a cyclic prefix (CP) or an information segment in a preamble signal symbol.

Alternatively, a preamble signal symbol comprises a first CP and an information segment.

Alternatively, the first time-point comprises a starting point of the first CP in the preamble signal symbol.

Alternatively, a preamble signal symbol comprises a second CP and M information segments, wherein M is a positive integer greater than or equal to 2.

Alternatively, the first time-point comprises a starting point of the second CP or one of the M information segments in the preamble signal symbol.

Alternatively, the first time-point comprises a starting point of a downlink signal symbol.

Alternatively, the processing unit is configured for detecting the preamble signal on the carrier in the unlicensed frequency band by a way of sliding window detection.

Alternatively, a time-length of each processing in the sliding window detection is a length of an information segment in a preamble signal symbol.

Alternatively, the communication unit is configured for receiving the downlink signal on the carrier from a second time-point after the preamble signal being detected.

Alternatively, the second time-point is a starting point of a downlink signal symbol.

Alternatively, a preamble signal symbol corresponds to a first subcarrier spacing; and the first subcarrier spacing is a subcarrier spacing corresponding to the downlink signal; or the first subcarrier spacing is a subcarrier spacing indicated by at least one of a radio resource control (RRC) signaling, a physical-layer signaling, and a MAC-layer signaling; or the first subcarrier spacing is a predefined subcarrier spacing.

Alternatively, a time-length for detecting the preamble signal is greater than or equal to a length of P preamble signal symbols, and P is a positive integer; or the time-length for detecting the preamble signal is greater than or equal to a length of information segments of Q preamble signal symbols, and Q is a positive integer greater than or equal to 2.

Alternatively, the preamble signal comprises N types of sequences, and N is a positive integer.

Alternatively, a subcarrier spacing of the preamble signal is greater than or equal to that of the downlink signal; or a length of a preamble signal symbol is less than or equal to a length of the downlink signal symbol.

Alternatively, a sequence of the preamble signal is mapped to M contiguous subcarriers on a first bandwidth in frequency domain, wherein a length of the sequence of the preamble signal is M, and M is a positive integer.

Alternatively, a subcarrier spacing of the preamble signal is greater than that of the downlink signal.

Alternatively, a sequence of the preamble signal is mapped to M discrete subcarriers on a first bandwidth in frequency domain, wherein any two adjacent subcarriers in the M discrete subcarriers has a same distance, a length of the sequence of the preamble signal is M, and M is a positive integer.

Alternatively, a subcarrier spacing of the preamble signal is equal to that of the downlink signal.

Alternatively, the M subcarriers occupy the full first bandwidth, a central part of the first bandwidth, or a predefined part of the first bandwidth.

Alternatively, no signal is mapped to other subcarriers on the first bandwidth except the subcarriers to which the sequence of the preamble signal is mapped.

Alternatively, when the preamble signal comprises at least two types of sequences, the at least two type of sequences are alternately transmitted in time domain.

Alternatively, when the preamble signal comprises at least two types of sequences, the at least two types of sequences are transmitted in time domain in a manner of one type of sequence being transmitted and then another type of sequence being transmitted.

Alternatively, a sequence of the preamble signal is at least one of a primary synchronization signal (PSS) sequence, a secondary synchronization signal (SSS) sequence, and a Zadoff-Chu sequence.

Alternatively, a sequence of the preamble signal is common to a cell, common to a group, or unique to a terminal device.

Alternatively, the preamble signal carries at least one of a cell identifier (ID), a public land mobile network (PLMN) ID, an RTS identifier, a CTS identifier, a position of the downlink signal in time domain, and channel occupation time.

Alternatively, an antenna port for detecting the preamble signal is an omnidirectional antenna port or a directional antenna port.

Alternatively, the antenna port for receiving the preamble signal is same as that for receiving a synchronization signal block (SSB).

Alternatively, the preamble signal is spatially quasi-co-located (QCL) with an SSB or downlink control channel (PDCCH) located behind the preamble signal in time domain.

Alternatively, transmission parameters of the preamble signal are indicated to a terminal device in one way of a RRC, a PBCH, and a RMSI.

Alternatively, transmission parameters of the preamble signal are obtained in a way same as that in which transmission parameters of the PRACH are obtained.

Figure 13:
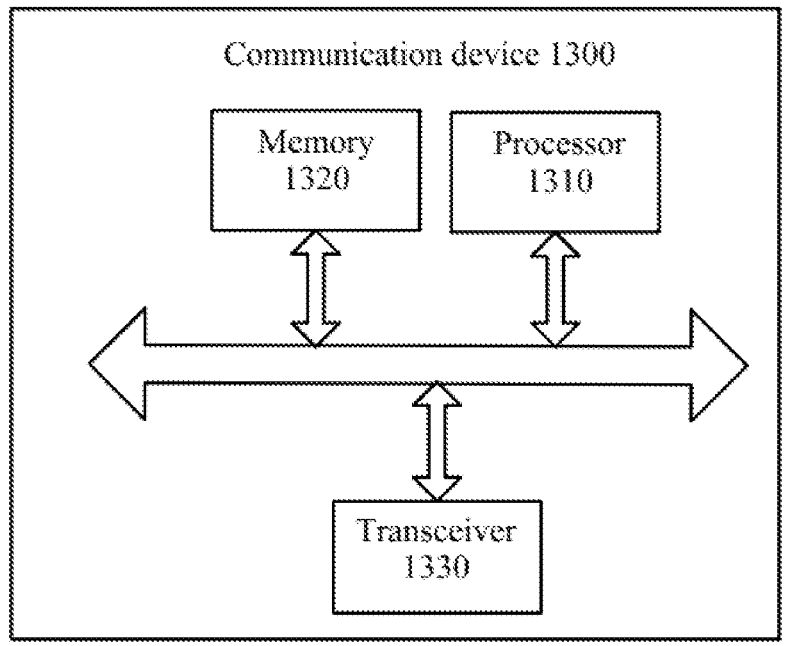
FIG. 13 is a schematic diagram of a communication device according to some embodiments of the present disclosure.

FIG. 13 is a schematic diagram of a communication device 1300 according to some embodiments of the present disclosure. The communication device 1300 shown in FIG. 13 includes a processor 1310. The processor 1310 can call and run a computer program from a memory to implement the method in the embodiments of the present disclosure.

Alternatively, as shown in FIG. 13, the communication device 1300 may further include a memory 1320. The processor 1310 may call and run the computer program from the memory 1320 to implement the method in the embodiment of the present disclosure.

The memory 1320 may be a separate device independent of the processor 1310, or may be integrated in the processor 1310.

Alternatively, as shown in FIG. 13, the communication device 1300 may further include a transceiver 1330. The processor 1310 may control the transceiver 1330 to communicate with other devices. Specifically, it may send information or data to other devices, or receive information or data from other devices.

The transceiver 1330 may include a transmitter and a receiver. The transceiver 1330 may further include an antenna. The number of antennas may be one or more.

Alternatively, the communication device 1300 may specifically be a network device according to some embodiments of the present disclosure. The communication device 1300 may implement a corresponding process implemented by the network device in the method of the embodiments of the present disclosure, which is not repeated here for brevity.

Alternatively, the communication device 1300 may specifically be a mobile terminal/terminal device of an embodiment of the present disclosure. The communication device 1300 may implement a corresponding process implemented by the mobile terminal/terminal device in the method of the embodiments of the present disclosure, which are not repeated here for brevity.

Figure 14:
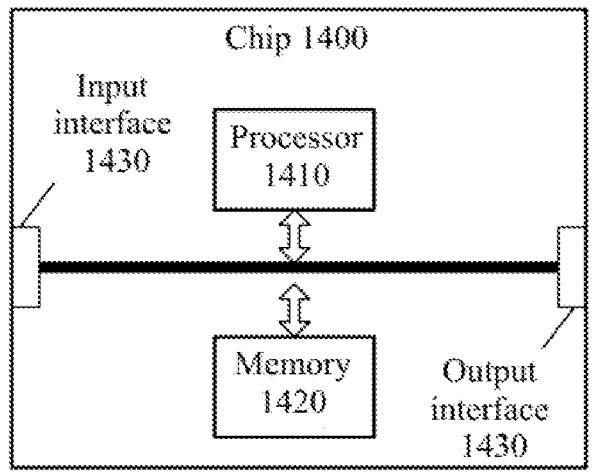
FIG. 14 is a schematic diagram of a chip according to some embodiments of the present disclosure.

FIG. 14 is a schematic diagram of a chip according to some embodiments of the present disclosure. The chip 1400 shown in FIG. 14 includes a processor 1410. The processor 1410 may call and run the computer program from the memory to implement the method in the embodiment of the present disclosure.

Alternatively, as shown in FIG. 14, the chip 1400 may further include a memory 1420. The processor 1410 may call and run the computer program from the memory 1420 to implement the method in the embodiments of the present disclosure.

The memory 1420 may be a separate device independent of the processor 1410, or may be integrated in the processor 1410.

Alternatively, the chip 1400 may further include an input interface 1430. The processor 1410 can control the input interface 1430 to communicate with other devices or chips. Specifically, it may obtain information or data sent by other devices or chips.

Alternatively, the chip 1400 may further include an output interface 1440. The processor 1410 can control the output interface 1440 to communicate with other devices or chips, Specifically, it may output information or data to other devices or chips.

Alternatively, the chip may specifically be a network device according to some embodiments of the present disclosure. The chip may implement a corresponding process implemented by the network device in the method of the embodiments of the present disclosure, which is not repeated here for brevity.

Alternatively, the chip may specifically be a mobile terminal/terminal device of an embodiment of the present disclosure. The chip may implement a corresponding process implemented by the mobile terminal/terminal device in the method of the embodiments of the present disclosure, which are not repeated here for brevity.

It should be understood that the chip in the embodiments of the present disclosure may also be referred to as a system-level chip, a system-chip, a chip system, or a system-on-chip, etc.

Figure 15:
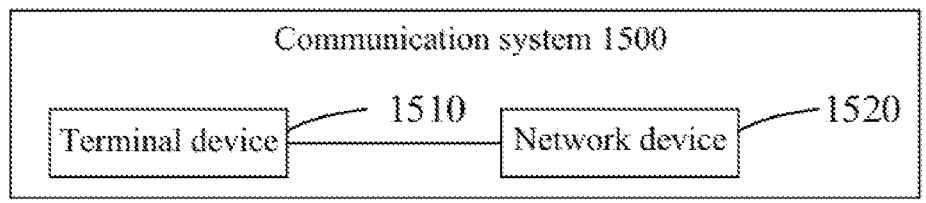
FIG. 15 is a schematic diagram of a communication system according to some embodiments of the present disclosure.

FIG. 15 is a schematic diagram of a communication system 1500 according to some embodiments of the present disclosure. As shown in FIG. 15, the communication system 1500 includes a terminal device 1510 and a network device 1520.

The terminal device 1510 can be used to implement a corresponding function implemented by the terminal device in the above method, and the network device 1520 can be used to implement a corresponding function implemented by the network device in the above method, which is not repeated here for brevity.

It should be understood that, the processor in the embodiments of the present disclosure may be an integrated circuit chip with a capability of signal processing. In the implementation process, the actions of the foregoing method embodiments can be completed by hardware integrated logic circuits in the processor or instructions in the form of software. The above-mentioned processor can be a general-purpose processor, a digital signal processor (DSP), an application specific integrated circuit (ASIC), a ready-made programmable gate array ( ) or other Programming logic devices, discrete-gate or transistor logic devices, discrete hardware components. The methods, steps, and logical block diagrams disclosed in the embodiments of the present disclosure can be implemented or executed. The general-purpose processor may be a microprocessor, or the processor may also be any conventional processor or the like. The actions of the method disclosed in the embodiments of the present disclosure may be directly embodied as being executed and completed by a hardware decoding processor, or executed and completed by a combination of hardware and software modules in a decoding processor. The software modules can be located in a mature storage medium in the art, for example, a random access memory, a flash memory, a read-only memory, a programmable read-only memory or an electrically erasable programmable memory, and registers. The storage medium is located in the memory, and the processor reads information in the memory and completes the actions of the above method in combination with its hardware.

It can be understood that the memory in the embodiments of the present disclosure may be a transitory memory or a non-transitory memory, or may include both a transitory and a non-transitory memory. The non-transitory memory can be read-only memory (ROM), programmable read-only memory (PROM), erasable programmable read-only memory (EPROM), electrically erasable programmable read-only memory (EEPROM), or flash memory. The transitory memory may be a random access memory (RAM), which is used as an external cache. By way of exemplary but not restrictive description, many forms of RAM are available, such as static random access memory (SRAM), dynamic random access memory (DRAM), synchronous dynamic random access memory (SDRAM), Double Data Rate SDRAM (DDR SDRAM), enhanced synchronous dynamic random access memory (ESDRAM), synchronous link dynamic random access memory (SLDRAM), and Direct Rambus RAM (DR RAM). It should be noted that the memories in the systems and methods described herein are intended to include, but are not limited to, these and any other suitable types of memories.

The embodiments of the present disclosure also provide a computer-readable storage medium for storing computer programs.

Alternatively, the computer-readable storage medium may be applied for a network device according to some embodiments of the present disclosure. The computer programs cause a computer to implement a corresponding process implemented by the network device in the method of the embodiments of the present disclosure, which is not repeated here for brevity.

Alternatively, the computer-readable storage medium may be applied for a mobile terminal/terminal device of an embodiment of the present disclosure. The computer program cause a computer to implement a corresponding process implemented by the mobile terminal/terminal device in the method of the embodiments of the present disclosure, which are not repeated here for brevity.

The embodiments of the present disclosure also provide a computer program product, including computer program instructions.

Alternatively, the computer program product may be applied for a network device according to some embodiments of the present disclosure. The computer program instructions cause a computer to implement a corresponding process implemented by the network device in the method of the embodiments of the present disclosure, which is not repeated here for brevity.

Alternatively, the computer program product may be applied for a mobile terminal/terminal device of an embodiment of the present disclosure. The computer program instructions cause a computer to implement a corresponding process implemented by the mobile terminal/terminal device in the method of the embodiments of the present disclosure, which are not repeated here for brevity.

The embodiments of the present disclosure also provide a computer program.

Alternatively, the computer program may be applied for a network device according to some embodiments of the present disclosure. The computer program, when executed on a computer, causes the computer to implement a corresponding process implemented by the network device in the method of the embodiments of the present disclosure, which is not repeated here for brevity.

Alternatively, the computer program product may be applied for a mobile terminal/terminal device of an embodiment of the present disclosure. The computer program, when executed on a computer, causes the computer to implement a corresponding process implemented by the mobile terminal/terminal device in the method of the embodiments of the present disclosure, which are not repeated here for brevity.

One of ordinary skill in the art may be aware that units and algorithm steps of the examples described in combination with the embodiments disclosed herein can be implemented by electronic hardware or a combination of computer software and the electronic hardware. Whether these functions are executed by hardware or software depends on a specific application and design constraint conditions of a technical solution. Professionals can use different methods for each specific application to implement the described functions, but such implementation should not be considered beyond the scope of present disclosure.

Those skilled in the art can clearly understand that, for the convenience and conciseness of description, the specific working process of the above-described system, device, and unit can refer to the corresponding process in the foregoing method embodiment, which will not be repeated here.

In the several embodiments provided in present disclosure, it should be understood that, the disclosed system, device, and method may be implemented in other ways. For example, the device described above are merely illustrative. For example, the division of the units is only a logical function division, and there may be other divisions in actual implementation. For example, multiple units or components can be combined or can be integrated into another system, or some features can be ignored or not implemented. In addition, the displayed or discussed mutual coupling, direct coupling, or communication connection may be indirect coupling or communication connection through some interfaces, devices or units, and may be in electrical, mechanical, or other forms.

The units described as separate components may or may not be physically separated, and the components displayed as units may or may not be physical units. That is, they may be located at one position, or they may be distributed on multiple network units. Some or all of the units may be selected according to actual needs to achieve the objectives of the solutions of the embodiments.

In addition, the functional units in each embodiment of the present disclosure may be integrated into one processing unit, or each unit may exist alone physically, or two or more units may be integrated into one unit.

If the function is implemented in the form of a software functional unit, and sold or used as an independent product, it can be stored in a computer readable storage medium. Based on this understanding, the technical solution of the present disclosure essentially, a part that contributes to the existing technology, or a part of the technical solution can be embodied in the form of a software product. The software product is stored in a storage medium, including several instructions causing a computer device (which may be a personal computer, a server, or a network device) execute all or part of the actions in the methods described in the various embodiments of the present disclosure. The afore-mentioned storage media include U disk, mobile hard disk, read-only memory (ROM), random access memory (RAM), magnetic disks or optical disks, and other media that can store program codes.

The above are only specific implementations of present disclosure, but the protection scope of present disclosure is not limited to this. Any person skilled in the art can easily think of changes or substitutions within the technical scope disclosed in present disclosure. Should be covered within the scope of protection of present disclosure. Therefore, the protection scope of present disclosure shall be subject to the protection scope of the claims.

The above are only specific embodiments of the present disclosure, but the protection scope of the present disclosure is not limited thereto. Any person skilled in the art can easily obtain changes or substitutions within the technical scope disclosed by the present disclosure, which should be covered within the protection scope of the present disclosure. Therefore, the protection scope of the present disclosure should be subject to the protection scope of the claims.

What is claimed is:

1. A wireless communication method, comprising:
performing channel detection for a carrier in an unlicensed frequency band; and
sending a preamble signal on the carrier from a first time-point, in response to the channel detection succeeding, the preamble signal being configured for indicating that the carrier has an ability to transmit a downlink signal;
wherein the first time-point is determined according to at least one of a format of a preamble signal symbol configured for sending the preamble signal and a time-point at which the channel detection succeeds; and
wherein the preamble signal symbol comprises a first cyclic prefix (CP) and an information segment and the first time-point comprises a starting point of the first CP in the preamble signal symbol; or
wherein the preamble signal symbol comprises a second CP and M information segments, wherein M is a positive integer greater than or equal to 2; and the first time-point comprises a starting point of the second CP or any one of the M information segments in the preamble signal symbol.

2. The method as claimed in claim 1, wherein when the first time-point is determined according to a format of a preamble signal symbol configured for sending the preamble signal, the first time-point comprises at least one of a candidate time-point in the preamble signal symbol and a starting point of the preamble signal symbol.

3. The method as claimed in claim 2, wherein the preamble signal symbol is the first preamble signal symbol which is located behind the time-point at which the channel detection succeeds.

4. The method as claimed in claim 1, further comprising:
sending an occupying signal or a CP of the preamble signal on the carrier from the time-point at which the channel detection succeeds to the first time-point, in response to the first time-point not being the time-point at which the channel detection succeeds.

5. The method as claimed in claim 1, wherein the first time-point comprises a starting point of a downlink signal symbol configured for sending the downlink signal.

6. The method as claimed in claim 5, further comprising:
sending the downlink signal on the carrier from a second time-point, after the preamble signal is sent, wherein the second time-point is a starting point of the downlink signal symbol.

7. The method as claimed in claim 6, wherein the preamble signal symbol corresponds to a first subcarrier spacing; and
the first subcarrier spacing is a subcarrier spacing greater than or equal to that corresponding to the downlink signal, or a length of the preamble signal symbol is less than or equal to a length of the downlink signal symbol; or
the first subcarrier spacing is a subcarrier spacing indicated by at least one of a radio resource control (RRC) signaling, a physical-layer signaling, and a MAC-layer signaling; or
the first subcarrier spacing is a predefined subcarrier spacing.

8. The method as claimed in claim 7, wherein a time-length for sending the preamble signal is greater than or equal to a length of P preamble signal symbols, and P is a positive integer; or
the time-length for sending the preamble signal is greater than or equal to a length of information segments of Q preamble signal symbols, and Q is a positive integer greater than or equal to 2.

9. The method as claimed in claim 6, wherein a sequence of the preamble signal is mapped to M contiguous subcarriers on a first bandwidth in frequency domain, wherein a length of the sequence of the preamble signal is M, and M is a positive integer, and a subcarrier spacing of the preamble signal is greater than that of the downlink signal; or
a sequence of the preamble signal is mapped to M discrete subcarriers on a first bandwidth in frequency domain, wherein any two adjacent subcarriers in the M discrete subcarriers has a same distance, a length of the sequence of the preamble signal is M, and M is a positive integer, and a subcarrier spacing of the preamble signal is equal to that of the downlink signal;
wherein the M subcarriers occupy the full first bandwidth, a central part of the first bandwidth, or a predefined part of the first bandwidth.

10. The method as claimed in claim 9, wherein no signal is mapped to other subcarriers on the first bandwidth except the subcarriers to which the sequence of the preamble signal is mapped.

11. The method as claimed in claim 1, wherein when the preamble signal comprises at least two types of sequences, the at least two types of sequences are transmitted in time domain in at least one of the following:
a manner of the sequences being alternately transmitted, and
a manner of one type of sequence being transmitted and then another type of sequence being transmitted.

12. A wireless communication method, comprising:
detecting a preamble signal on a carrier in an unlicensed frequency band from a first time-point; and
receiving a downlink signal on the carrier, in response to the preamble signal being successfully detected;
wherein the first time-point is determined according to at least one of a format of a preamble signal symbol configured for sending the preamble signal and a time-point at which the channel detection succeeds; and
wherein the preamble signal symbol comprises a first cyclic prefix (CP) and an information segment; and the first time-point comprises a starting point of the first CP in the preamble signal symbol; or
wherein the preamble signal symbol comprises a second CP and M information segments, wherein M is a positive integer greater than or equal to 2; and the first time-point comprises a starting point of the second CP or any one of the M information segments in the preamble signal symbol.

13. The method as claimed in claim 12, wherein the detecting a preamble signal on a carrier in an unlicensed frequency band comprises:
detecting the preamble signal on the carrier in the unlicensed frequency band by a way of sliding window detection;
wherein a time-length of each processing in the sliding window detection is a length of an information segment in a preamble signal symbol for sending the preamble signal.

14. A network device, comprising a processor and a memory storing a computer program, the processor being configured for calling and performing the computer program stored in the memory to execute:
performing channel detection for a carrier in an unlicensed frequency band; and
sending a preamble signal on the carrier from a first time-point, in response to the channel detection succeeding, the preamble signal being configured for indicating that the carrier has an ability to transmit a downlink signal;
wherein the first time-point is determined according to at least one of a format of a preamble signal symbol configured for sending the preamble signal and a time-point at which the channel detection succeeds; and
wherein the preamble signal symbol comprises a first cyclic prefix (CP) and an information segment and the first time-point comprises a starting point of the first CP in the preamble signal symbol; or
wherein the preamble signal symbol comprises a second CP and M information segments, wherein M is a positive integer greater than or equal to 2; and the first time-point comprises a starting point of the second CP or any one of the M information segments in the preamble signal symbol.

15. The network device as claimed in claim 14, wherein when the first time-point is determined according to a format of a preamble signal symbol configured for sending the preamble signal, the first time-point comprises at least one of a candidate time-point in the preamble signal symbol and a starting point of the preamble signal symbol.

16. The network device as claimed in claim 15, wherein the preamble signal symbol is the first preamble signal symbol which is located behind the time-point at which the channel detection succeeds.

17. The network device as claimed in claim 14, wherein the processor is configured for calling and performing the computer program stored in the memory to further execute:
sending an occupying signal or a CP of the preamble signal on the carrier from the time-point at which the channel detection succeeds to the first time-point, in response to the first time-point not being the time-point at which the channel detection succeeds.

18. The network device as claimed in claim 14, wherein the first time-point comprises a starting point of a downlink signal symbol configured for sending the downlink signal.

19. The network device as claimed in claim 18, wherein the processor is configured for calling and performing the computer program stored in the memory to further execute:
sending the downlink signal on the carrier from a second time-point, after the preamble signal is sent, wherein the second time-point is a starting point of the downlink signal symbol.

20. The network device as claimed in claim 19, wherein the preamble signal symbol corresponds to a first subcarrier spacing; and
the first subcarrier spacing is a subcarrier spacing greater than or equal to that corresponding to the downlink signal, or a length of the preamble signal symbol is less than or equal to a length of the downlink signal symbol; or
the first subcarrier spacing is a subcarrier spacing indicated by at least one of a radio resource control (RRC) signaling, a physical-layer signaling, and a MAC-layer signaling; or
the first subcarrier spacing is a predefined subcarrier spacing.

21. The network device as claimed in claim 20, wherein a time-length for sending the preamble signal is greater than or equal to a length of P preamble signal symbols, and P is a positive integer; or
the time-length for sending the preamble signal is greater than or equal to a length of information segments of Q preamble signal symbols, and Q is a positive integer greater than or equal to 2.

22. The network device as claimed in claim 19, wherein a sequence of the preamble signal is mapped to M contiguous subcarriers on a first bandwidth in frequency domain, wherein a length of the sequence of the preamble signal is M, and M is a positive integer, and a subcarrier spacing of the preamble signal is greater than that of the downlink signal; or
a sequence of the preamble signal is mapped to M discrete subcarriers on a first bandwidth in frequency domain, wherein any two adjacent subcarriers in the M discrete subcarriers has a same distance, a length of the sequence of the preamble signal is M, and M is a positive integer, and a subcarrier spacing of the preamble signal is equal to that of the downlink signal;
wherein the M subcarriers occupy the full first bandwidth, a central part of the first bandwidth, or a predefined part of the first bandwidth.

23. The network device as claimed in claim 22, wherein no signal is mapped to other subcarriers on the first bandwidth except the subcarriers to which the sequence of the preamble signal is mapped.

24. A terminal device, comprising a processor and a memory storing a computer program, the processor being configured for calling and performing the computer program stored in the memory to execute:
detecting a preamble signal on a carrier in an unlicensed frequency band from a first time-point; and
receiving a downlink signal on the carrier, in response to the preamble signal being successfully detected;
wherein the first time-point is determined according to at least one of a format of a preamble signal symbol configured for sending the preamble signal and a time-point at which the channel detection succeeds; and
wherein the preamble signal symbol comprises a first cyclic prefix (CP) and an information segment; and the first time-point comprises a starting point of the first CP in the preamble signal symbol; or
wherein the preamble signal symbol comprises a second CP and M information segments, wherein M is a positive integer greater than or equal to 2; and the first time-point comprises a starting point of the second CP or any one of the M information segments in the preamble signal symbol.

* * * * *